US010022999B2

(12) United States Patent
Holmes

(10) Patent No.: US 10,022,999 B2
(45) Date of Patent: Jul. 17, 2018

(54) SECURITY DEVICE

(75) Inventor: Brian William Holmes, Fleet (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 1514 days.

(21) Appl. No.: 13/696,680

(22) PCT Filed: May 6, 2011

(86) PCT No.: PCT/GB2011/050881
§ 371 (c)(1),
(2), (4) Date: Dec. 28, 2012

(87) PCT Pub. No.: WO2011/138616
PCT Pub. Date: Nov. 10, 2011

(65) Prior Publication Data

US 2013/0106092 A1 May 2, 2013

(30) Foreign Application Priority Data

May 7, 2010 (GB) .................................. 1007695.8

(51) Int. Cl.

| | |
|---|---|
| ***B42D 15/00*** | (2006.01) |
| ***B42D 15/10*** | (2006.01) |
| ***G02B 5/18*** | (2006.01) |
| ***G02B 27/42*** | (2006.01) |
| ***G02B 27/44*** | (2006.01) |
| ***B42D 25/29*** | (2014.01) |
| *B44F 7/00* | (2006.01) |
| *B42D 25/328* | (2014.01) |

(52) U.S. Cl.
CPC ............ *B42D 15/00* (2013.01); *B42D 25/29* (2014.10); *B42D 25/328* (2014.10); *B44F 7/00* (2013.01)

(58) Field of Classification Search
CPC ...... B42D 15/00; B42D 25/29; B42D 25/328; B44F 7/00
USPC ...... 283/72, 94, 98, 107, 901; 359/558, 566, 359/568, 569, 570, 572, 573, 574, 575, 359/576
See application file for complete search history.

(56) References Cited

U.S. PATENT DOCUMENTS 4,652,015 A 3/1987 Crane
2009/0316238 A1 12/2009 Drinkwater
(Continued)

FOREIGN PATENT DOCUMENTS

EP 0 059 056 B1 9/1982
EP 0 723 501 B1 7/1996
(Continued)

OTHER PUBLICATIONS

Aug. 23, 2011 International Search Report issued in Patent Application No. PCT/GB2011/050881.
(Continued)

*Primary Examiner* — Justin V Lewis
(74) *Attorney, Agent, or Firm* — Oliff PLC

(57) ABSTRACT

A security device including a substrate carrying a surface relief optically variable effect generating structure formed by the super position of three diffractive image generating structures (rear, surface and front planes) which respond to respectively different color components or wavelength ranges of white light to generate a first, substantially achromatic image or background pattern located in a plane spaced from the surface of the substrate.

17 Claims, 30 Drawing Sheets

H1 to H2 transfer geometry - view transverse to axis of parallax

(56) References Cited

U.S. PATENT DOCUMENTS

| | | | | |
|---|---|---|---|---|
| 2010/0045024 | A1* | 2/2010 | Attner | B32B 29/06 283/72 |
| 2010/0172000 | A1* | 7/2010 | Holmes | G03H 1/028 359/2 |
| 2011/0117478 | A1 | 5/2011 | Kitamura | |

FOREIGN PATENT DOCUMENTS

| | | | | |
|---|---|---|---|---|
| EP | 0 724 519 | B1 | 8/1996 | |
| EP | 0 860 298 | B1 | 8/1998 | |
| EP | 1 141 480 | B1 | 10/2001 | |
| EP | 1 398 174 | A1 | 3/2004 | |
| EP | 1 897 700 | A2 | 3/2008 | |
| JP | H05-88600 | A | 4/1993 | |
| JP | 2010-020005 | A | 1/2010 | |
| WO | WO 83/00659 | A1 | 3/1983 | |
| WO | WO 92/09444 | A1 | 6/1992 | |
| WO | WO 02/03323 | A1 | 1/2002 | |
| WO | WO 03/054297 | A2 | 7/2003 | |
| WO | WO 03/091952 | A2 | 11/2003 | |
| WO | WO 03/091953 | A2 | 11/2003 | |
| WO | WO 03/095188 | A2 | 11/2003 | |
| WO | 2005/069085 | A1 | 7/2005 | |
| WO | WO 2005/069085 | A1 | 7/2005 | |
| WO | WO 2008152389 | A2 * | 12/2008 | G03H 1/028 |

OTHER PUBLICATIONS

Aug. 23, 2011 Written Opinion issued in Patent Application No. PCT/GB2011/050881.

Jun. 16, 2015 Office Action issued in Japanese Patent Application No. 2013-508554.

* cited by examiner 2 plane achromatic hologram example: black symbols on achromatic background Plane or Layer Arrangement 2 layer achromatic hologram example: repeat pattern of black symbols on achromatic background Plane or Layer Arrangement 2 plane achromatic hologram example: achromatic symbols on black background Plane or Layer Arrangement 2 layer achromatic example: symbols on black background H1 Geometry (Parallax View)

H1 achromatic background - view transverse to axis of parallax

Red Slit Recording

H1 Red slit, achromatic background - view transverse to axis of dispersion (colour)

Green Slit Recording

H1 Green slit, achromatic background - view transverse to axis of dispersion (colour)

Blue Slit Recording

H1 Blue slit, achromatic background - view transverse to axis of dispersion (colour)

H1 to H2 transfer geometry - view transverse to axis of parallax

Projection of Green slit - view transverse to axis of dispersion (colour)

Projection of Red slit - view transverse to axis of dispersion (colour)

Projection of Blue slit - view transverse to axis of dispersion (colour)

H1 achromatic background - view transverse to axis of parallax

Red Slit Recording

H1 Red slit, achromatic background - view transverse to axis of dispersion (colour)

Green Slit Recording

H1 Green slit, achromatic background - view transverse to axis of dispersion (colour)

Blue Slit Recording

H1 Blue slit, achromatic background - view transverse to axis of dispersion (colour)

3 layer black image with achromatic surround

H1 achromatic background - view transverse to axis of parallax

Red Slit Recording

H1 Red slit, achromatic background - view transverse to axis of dispersion (colour)

H1 Green slit, achromatic background - view transverse to axis of dispersion (colour)

Blue Slit Recording

H1 Blue slit, achromatic background - view transverse to axis of dispersion (colour)

H1 to H2 transfer geometry - view transverse to axis of parallax

Projection of Green slit - view transverse to axis of dispersion (colour)

Projection of Red slit - view transverse to axis of dispersion (colour)

Projection of Blue slit - view transverse to axis of dispersion (colour)

SECURITY DEVICE

The invention relates to a security device for use on articles of value such as banknotes and the like.

A well known group of security devices comprise surface relief microstructures which, in response to incident radiation, replay holograms, Kinegrams, Pixelgrams and other diffractive effects.

Recently, so-called achromatic holograms have been developed as security devices. With such devices, a hologram achromat replay is observed when there is a substantially balanced diffractive or holographic replay of the three primary colours red, green and blue with no visual bias towards the red, green or blue) when viewed at a preferred tilt angle or range of tilt angles. The desired effect is a fairly bright grey-white. In practice, a true white is not quite attained but something which approximates. To the layman, the observation will be that the device looks a fairly colourless (essentially a neutral chroma) dullish white. An alternative approach used in the art is to record the achromat hologram or DOVID with diffractive structure with a sufficiently large pitch or periodicity such that it only weakly disperses the light into its constituent colours—a suitable periodicity would be 10 um or more. The drawback of such an approach is that the first order diffractive image is very close in its reconstruction or viewing angle to the specular reflection (or the zero order diffractive replay) of the device limiting its visual effectiveness and the range of visual effects that can be presented.

These devices have been developed because they are more difficult to simulate using conventional decorative foils and commercial dot-matrix systems. As far as decorative foils are concerned, this difficulty arises because such foils are intended to provide a multi-colour rainbow or iridescent effect and thus obtaining a commercially available decorative foil which provides an achromatic effect is unlikely.

As far as dot-matrix origination systems are concerned, commercially available systems are not designed or engineered for generating an achromatic hologram partly because there is little demand for non-iridescent achromatic hologram effects within the commercial and decorative markets. Also, the generation of an achromatic effect within a two-dimensional grating structure requires that that structure be configured into a mutually interlaced system of red, green and blue grating pixels or structure elements akin to that seen on coloured LCD and CRT displays systems—this is illustrated schematically in FIG. 1 which shows a 2D diffractive image of the symbol or motif '50'. More particularly for a true achromatic effect it is a requirement that the grating pixel and orientation for each of the respective RGB pixels visually overlap within the typical viewing zone of the observer. Now since dot-matrix systems typically record their grating pixels with a unique grating pitch and orientation, their pixels as a consequence redirect the light in a highly directional non diffuse manner. Consequently, the technical challenge of ensuring that their respective light ray (i.e. far field diffraction patterns) overlap in the observer's field of view, is difficult and problematic.

Despite the success of these known achromatic holograms, the speed of development of commercially available dot-matrix systems is such that it is inevitable that it will soon be possible to simulate achromatic holograms using dot-matrix systems to a level which makes them difficult to detect as counterfeits by the average user.

In accordance with the present invention, a security device comprises a substrate carrying a surface relief optically variable effect generating structure formed by the super position of three diffractive image generating structures which respond to respectively different colour components or wavelength ranges of white light to generate a first, substantially achromatic image or background pattern located in a plane spaced from the surface of the substrate.

We have realised that a significant advance in the form of achromatic holograms can be achieved by introducing a "depth" aspect to the device. All current achromatic holograms generate 2D imagery based on complex arrangements of elementary diffraction gratings. It is for this reason that dot-matrix systems will soon be able to simulate such achromatic holograms due to their 2D nature. The invention combines the achromatic imagery with a pronounced holographic depth so that as the device is tilted, the achromatic image or background moves with respect to the edge of the device.

In some examples, the device could simply comprise the first achromatic image or background pattern but this may make it difficult to note movement of the image as the security device is tilted. Preferably, therefore, the optically variable effect generating structure forms a second image in the plane of the substrate.

This second image could be achromatic as well or alternatively could be a non-diffractive or non-holographic image.

The plane in which the first achromatic image is located could either be in front of or behind the surface of the substrate.

In order to optimise the movement effect, the spacing between the plane of the first achromatic image or background pattern and the plane of the substrate is preferably such that, on tilting the device, the first achromatic image or background exhibits apparent movement relative to the substrate plane, the rate of movement being at least 6 mm per radian of tilt, and the product of the rate of movement and the included angle of the viewing zone defining a distance at least 18% of the dimension of the device in the direction of movement of the first achromatic image or pattern.

In further examples, the device may further comprise a second achromatic image, the first and second achromatic images appearing in respective first and second planes in front of and behind the surface of the substrate respectively.

This provides an even more easily verifiable device but one which is particularly difficult to counterfeit. In this case, preferably, the spacing between the plane of the first achromatic image or background pattern and the plane of the second achromatic image is such that, on tilting the device, the first achromatic image or background exhibits apparent movement relative to the second achromatic image, the rate of movement being at least 6 mm per radian of tilt, and the product of the rate of movement and the included angle of the viewing zone defining a distance at least 18% of the dimension of the device in the direction of movement of the first achromatic image or pattern.

The achromatic images can define a variety of shapes including alphanumeric indicia, graphical designs, symbols and the like. A shape may define a symbol by its nature or form (have a visual meaning, association or resonance with observer). Preferably, the symbolic form should be readily recognisable and may be directly (i.e. same as artwork on document) or indirectly (i.e. relevant to theme, region, value of document) linked or associated with a document (or article) on which the device is provided. Symbols typically have a minimum size or dimension of at least 2 mm. The symbol width and height should preferably be at least 3 mm but be less than 5 mm—i.e. the symbol should fall outside the boundaries of a 3×3 mm box but be enclosed by a 5×5 mm box. The extent to which the symbol may preferably exceed 3 mm is determined by its detailed form.

This sizing criteria firstly will ensure the symbol is large to be recognized by the unaided eye and secondly because the symbol's width exceeds the typical blur anticipated then its left edge and right edge outline will remain robust.

Examples of symbols are geometric shapes, trademarks, national emblems. Symbols should be contrasted with pixels of diffractive structures such as Kinegrams which are of a completely different order of magnitude. Such pixels in themselves cannot constitute symbols since they are not readily recognisable.

Generally the symbols should have simple discretely bounded shapes which fall into one of the following embodiments or categories:

- In one embodiment, the depth symbol should preferably consist of a single vertical structural element or segment combining with one or more horizontal sectors up to a maximum of 3:
  - For example, a single horizontal element could give a T type structure
  - whilst an example of a symbol with three horizontal segments would be the letter E
- In another embodiment, the symbol can comprise a diagonal structural element (at an angle above the horizontal of 45 degrees or more) combined with a horizontal segment.
- In another embodiment, the symbol can be two diagonal segments with one segment being at angle 45 degrees or more above horizontal and the other segment 45 degrees below the horizontal.

Devices according to the invention can be provided on or in articles such as articles of value including documents such as banknotes and the like. The article can provide a paper or plastics substrate or as a security thread. In addition, such devices can be provided in the form of transferable labels on a carrier in a conventional manner.

The device may be positioned within the document such that the device has a first face on a first side of the document and a second face on an opposing side of the document. Thus the security device may adopt a through-thickness arrangement. The device may be mounted to a window in the document or may actually function as the window. If the image presented on the second face is generated by the same hologram structure as that presenting an image on the first face, then the image on the second face will be pseudoscopic i.e. layer order will appear reversed but hidden detail will not be preserved (i.e. back to front) and the handedness of the artwork mirror reversed. Windows in banknotes are known in the art and typically allow an observer to look through the banknote, as a security feature. For example, WO 83/00659 describes a polymer banknote formed from a transparent substrate comprising an opacifying coating on both sides of the substrate. The opacifying coating is omitted in localised regions on both sides of the substrate to form a transparent region. EP 1141480 describes a method of making a transparent region in a paper substrate. Other methods for forming transparent regions in paper substrates are described in EP 0723501, EP 0724519, EP 1398174 and WO 03/054297.

The image(s) is viewable under white light illumination.

The surface relief microstructure is typically provided with a reflective backing such as a metallisation (continuous or ink demet pattern) or a high refractive index layer such as ZnS.

The microstructure can be formed by any conventional process such as hot embossing and casting. Hot embossing utilizes a metal shim that is impressed into a polymer carrier under heat and pressure, the carrier may optionally be coated with an embossed lacquer. Casting makes use of a radiation curing resin. The resin is cast onto a surface and is then embossed with the holographic relief during the embossing process or immediately afterwards the radiation curable resin is cured. This provides a more durable hologram.

Some examples of security devices according to the invention together with methods for manufacturing those devices will now be described with reference to the accompanying drawings, in which:—

Figure 5:
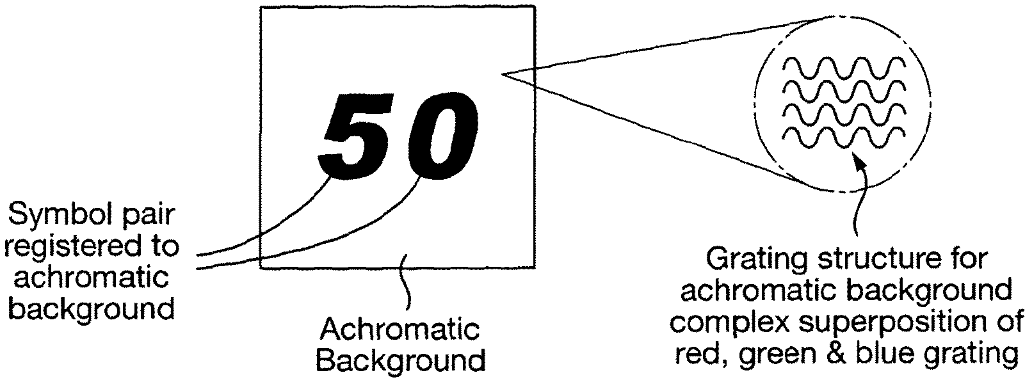
FIG. 5 illustrates in more detail the first example of a device according to the invention formed by non-diffractive symbols on an achromatic background registered with the edges of the device.
Figure 5:
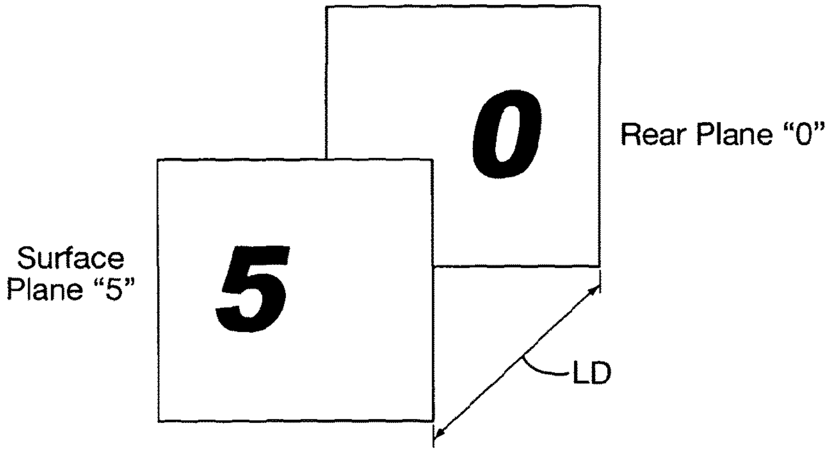
Figure 6:
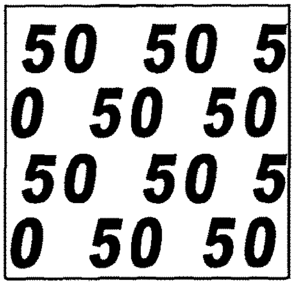
FIG. 6 illustrates a second example of a device according to the invention with non-diffractive symbols on an achromatic background, the symbols not being registered to the device.
Figure 6:
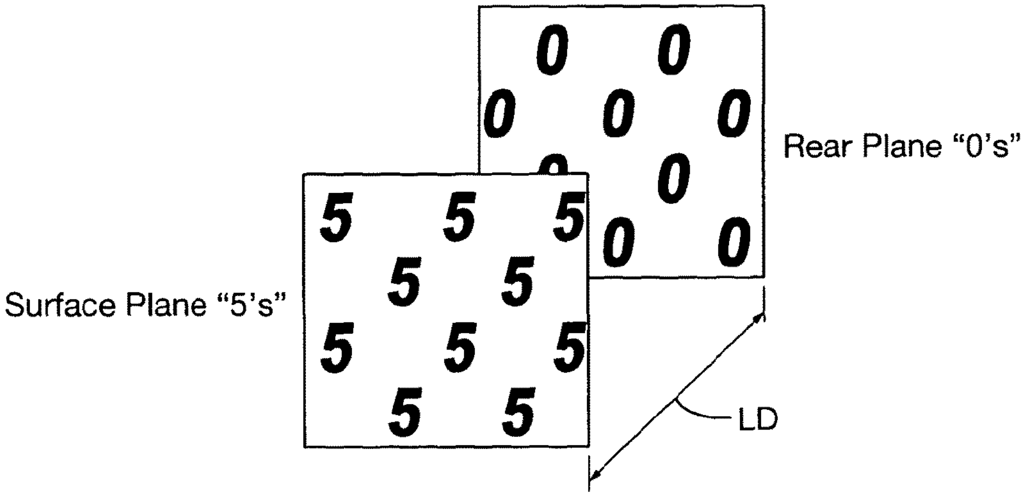
Figure 7:
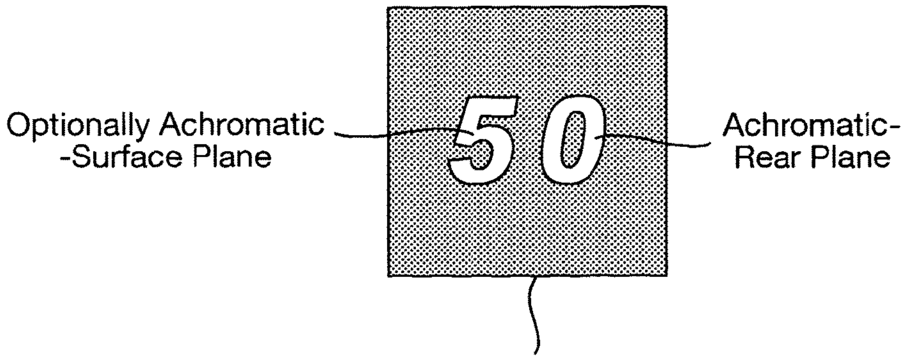
Figure 7:
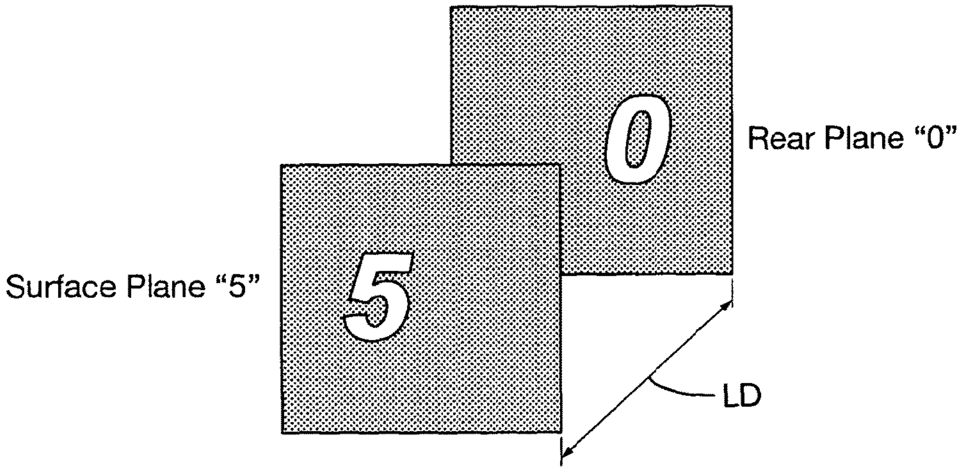
Figure 7A:
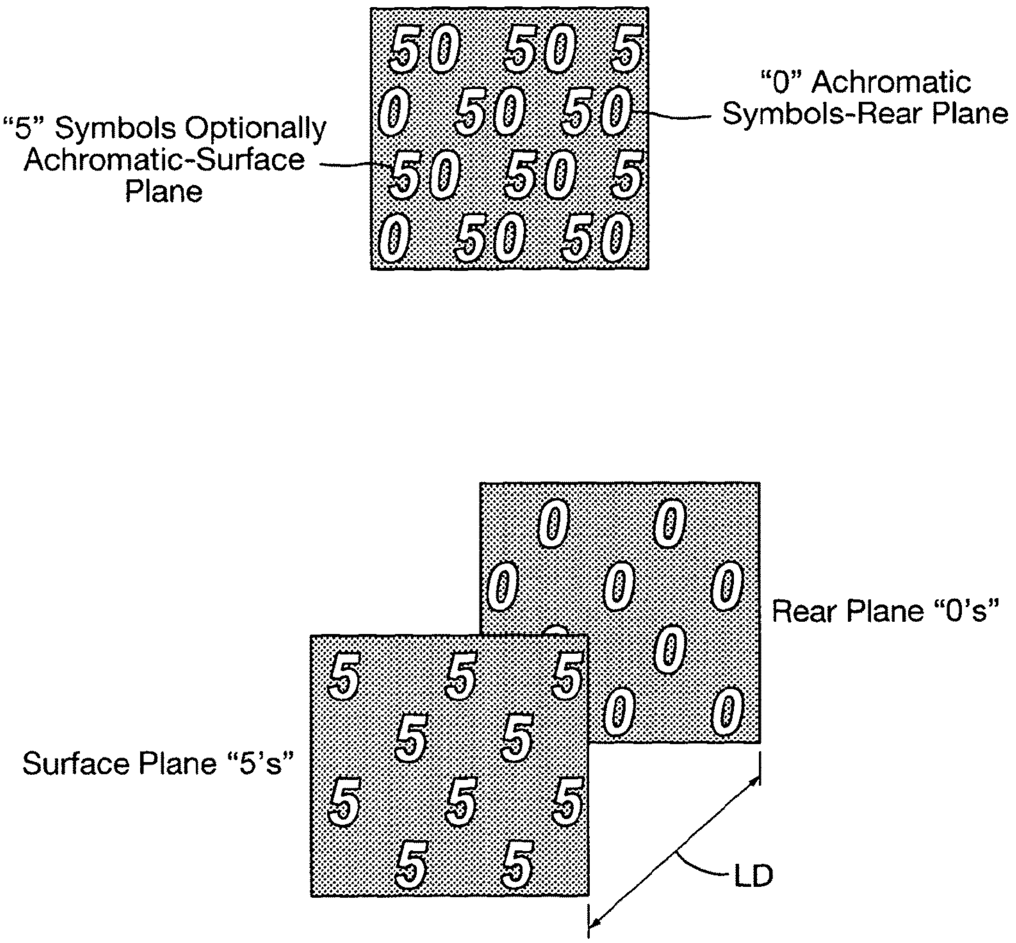
Figure 8:
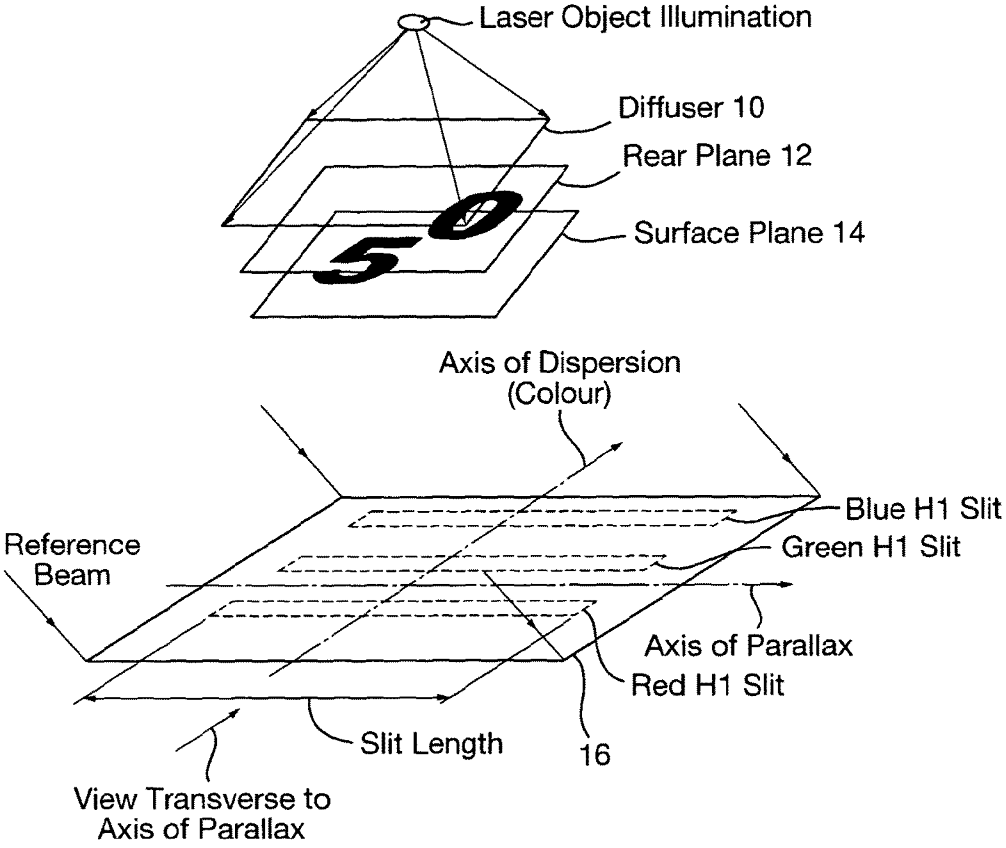
Figure 9:
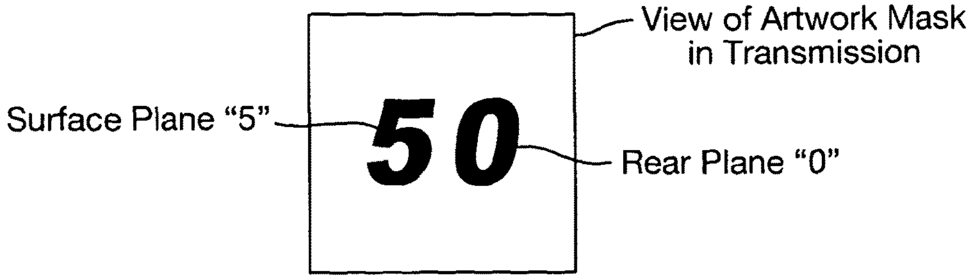
Figure 9:
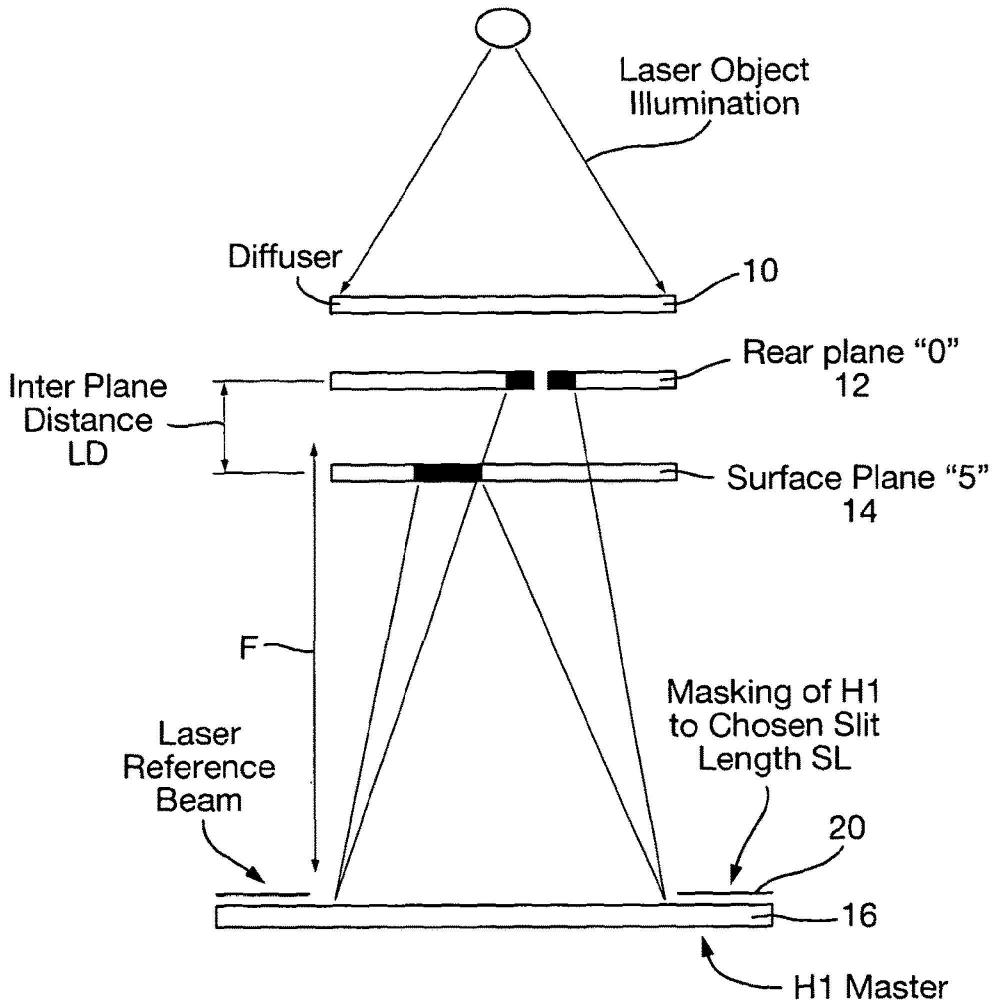
Figure 10A:
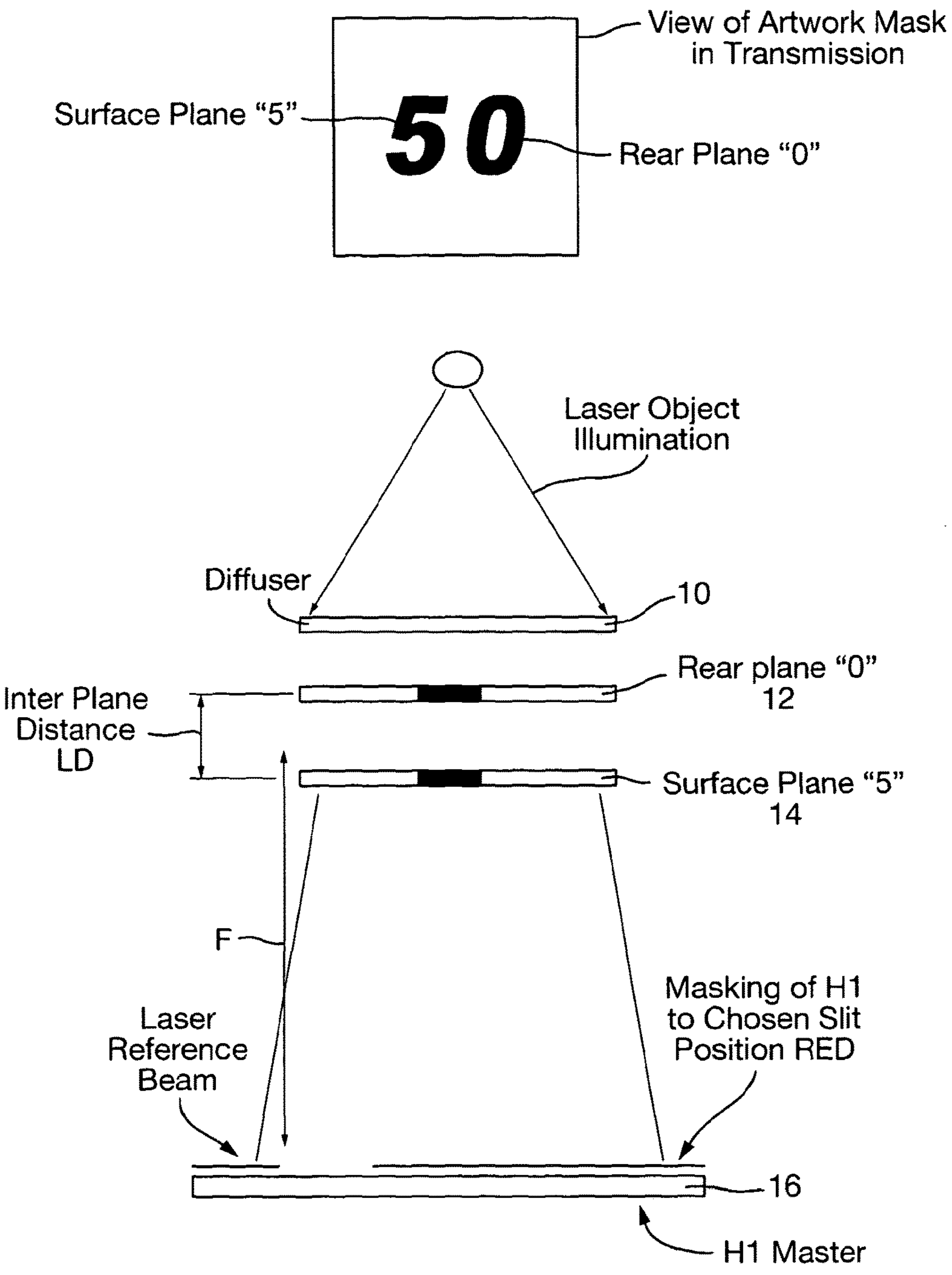
Figure 10B:
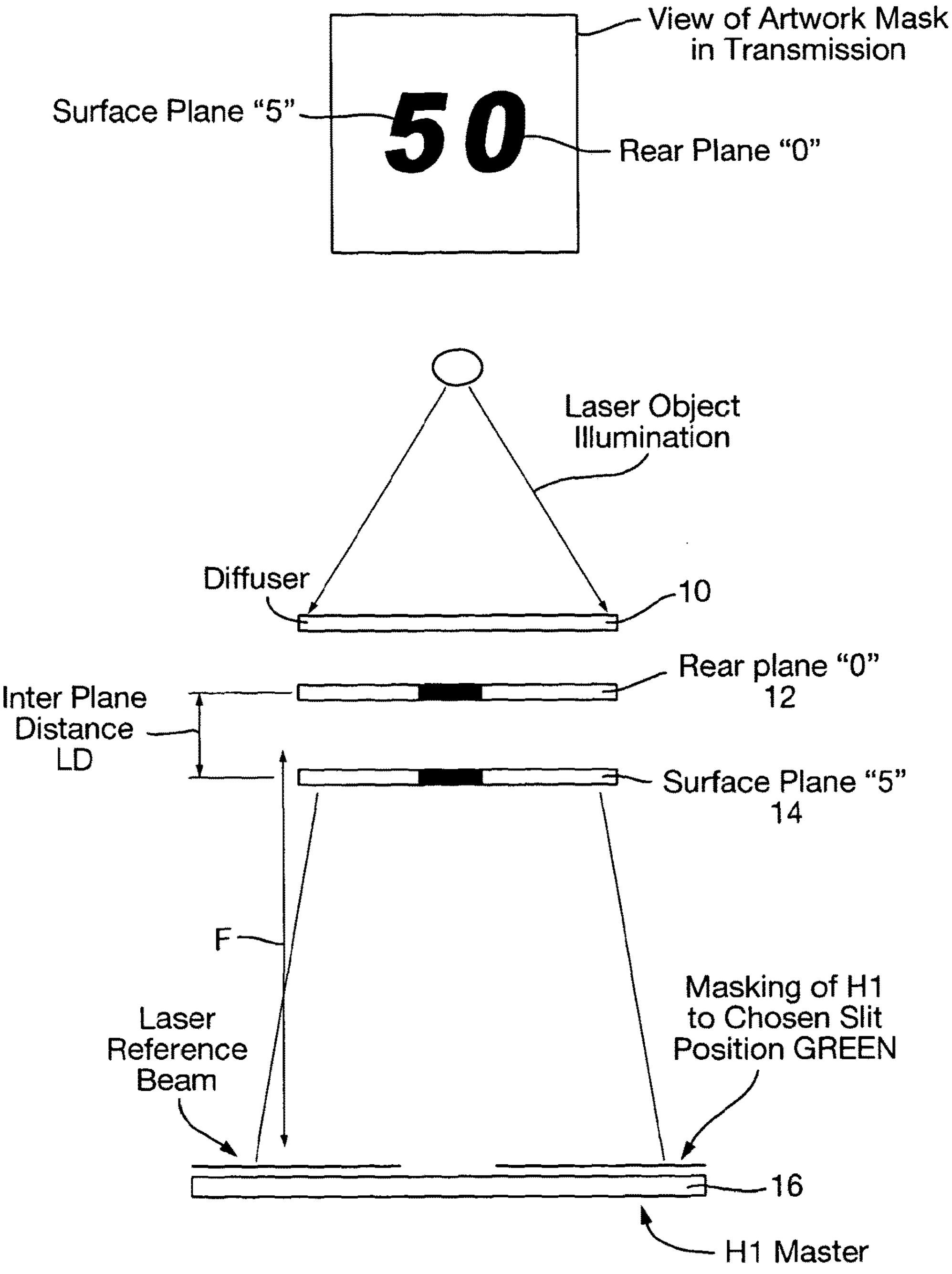
Figure 10C:
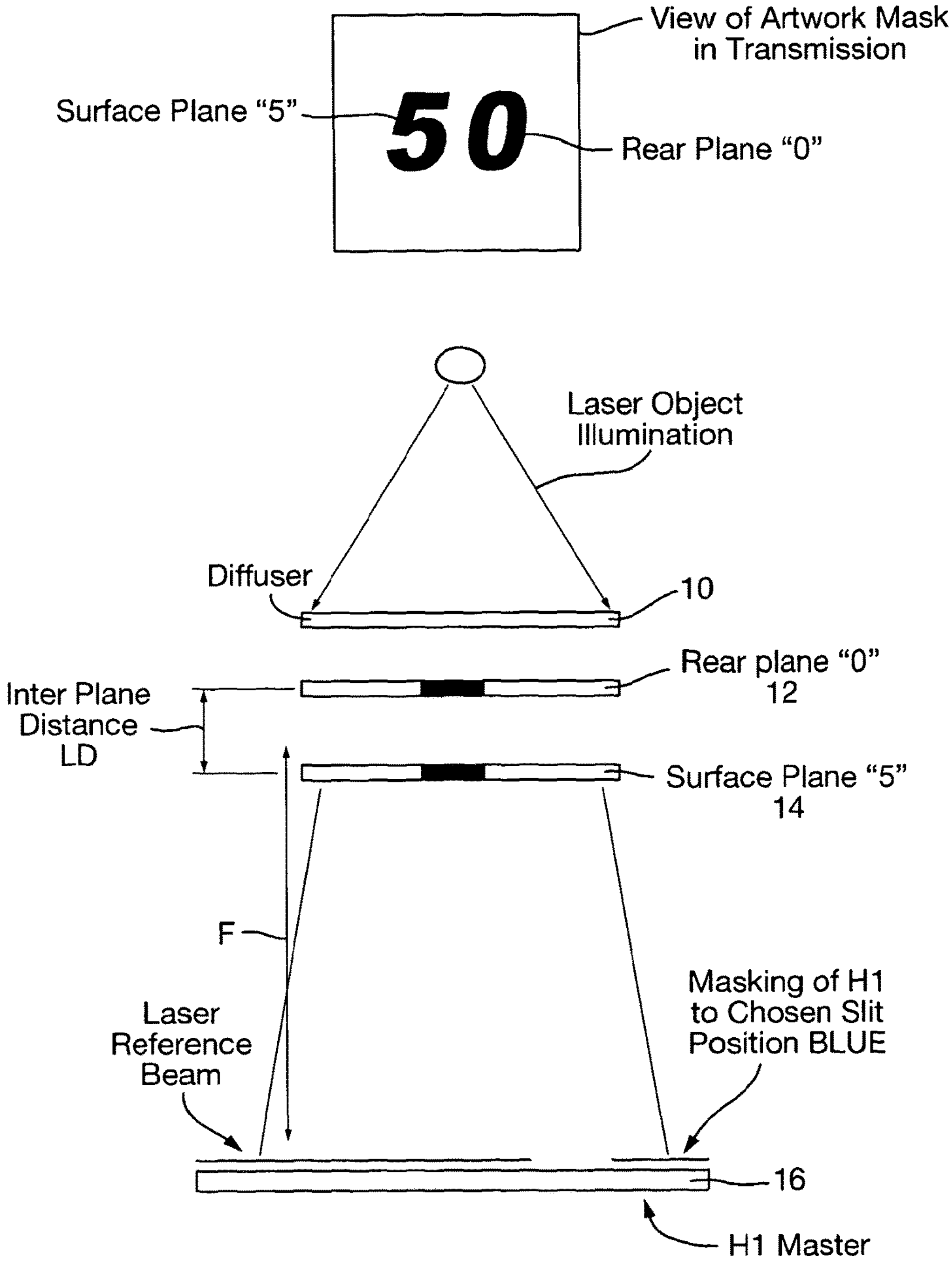
Figure 11:
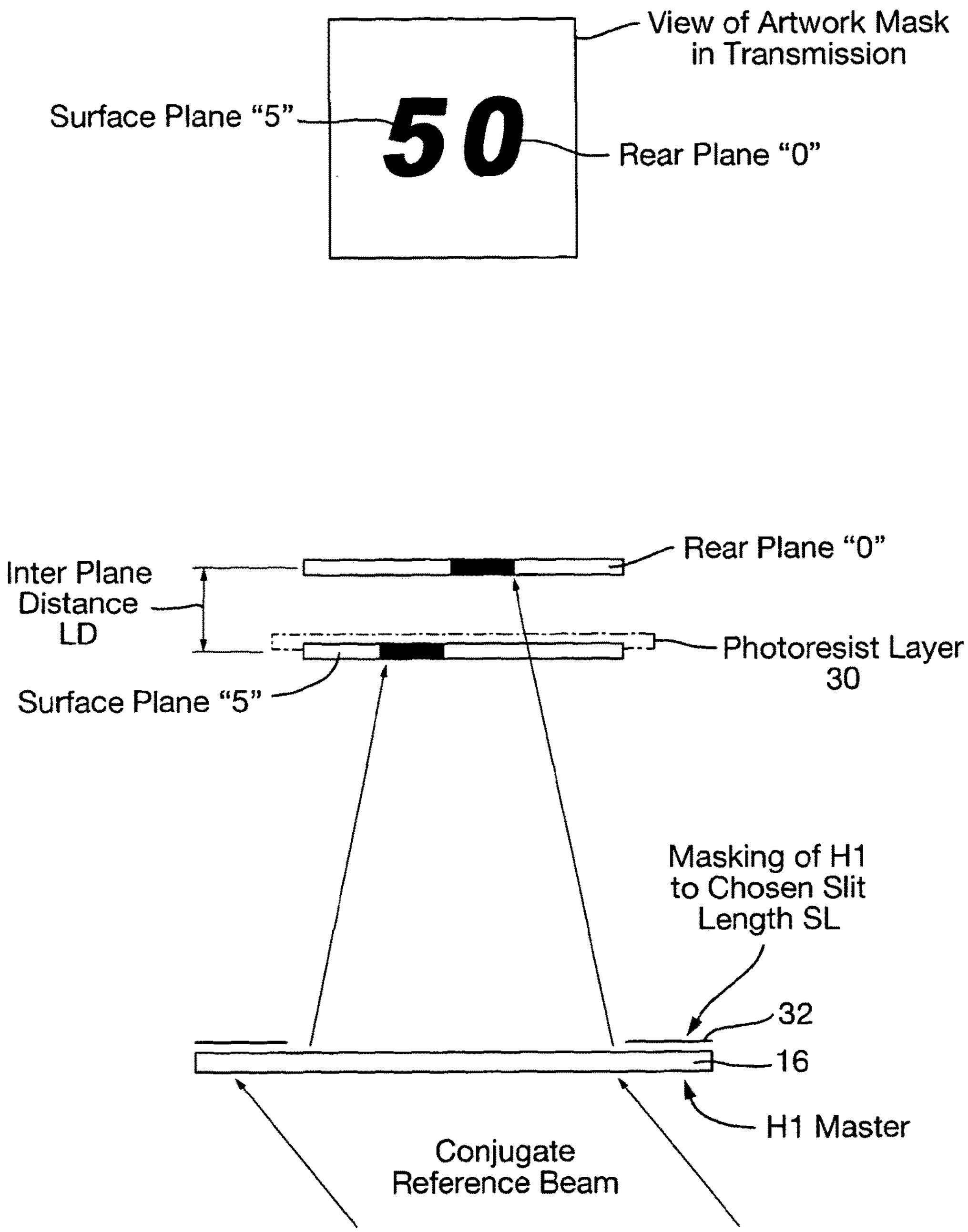
Figure 12A:
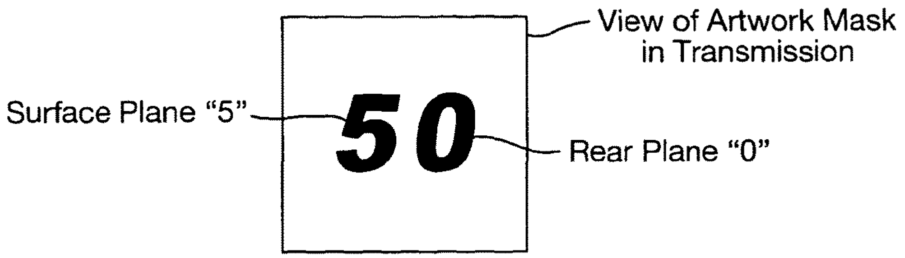
Figure 12A:
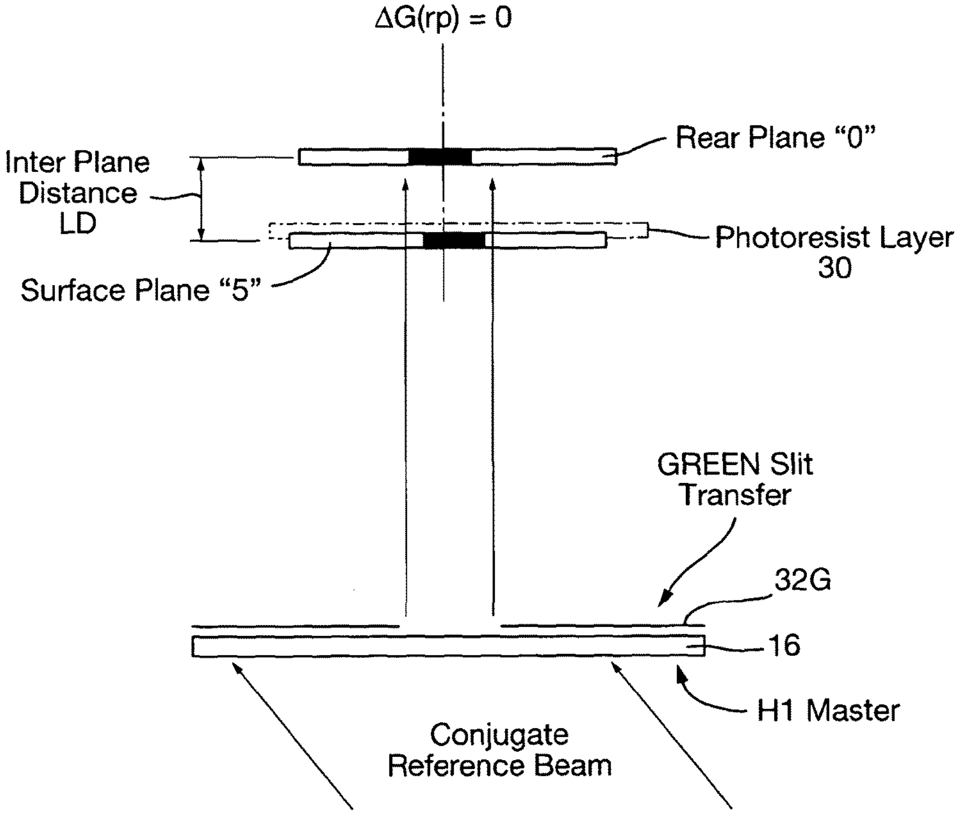
Figure 12B:
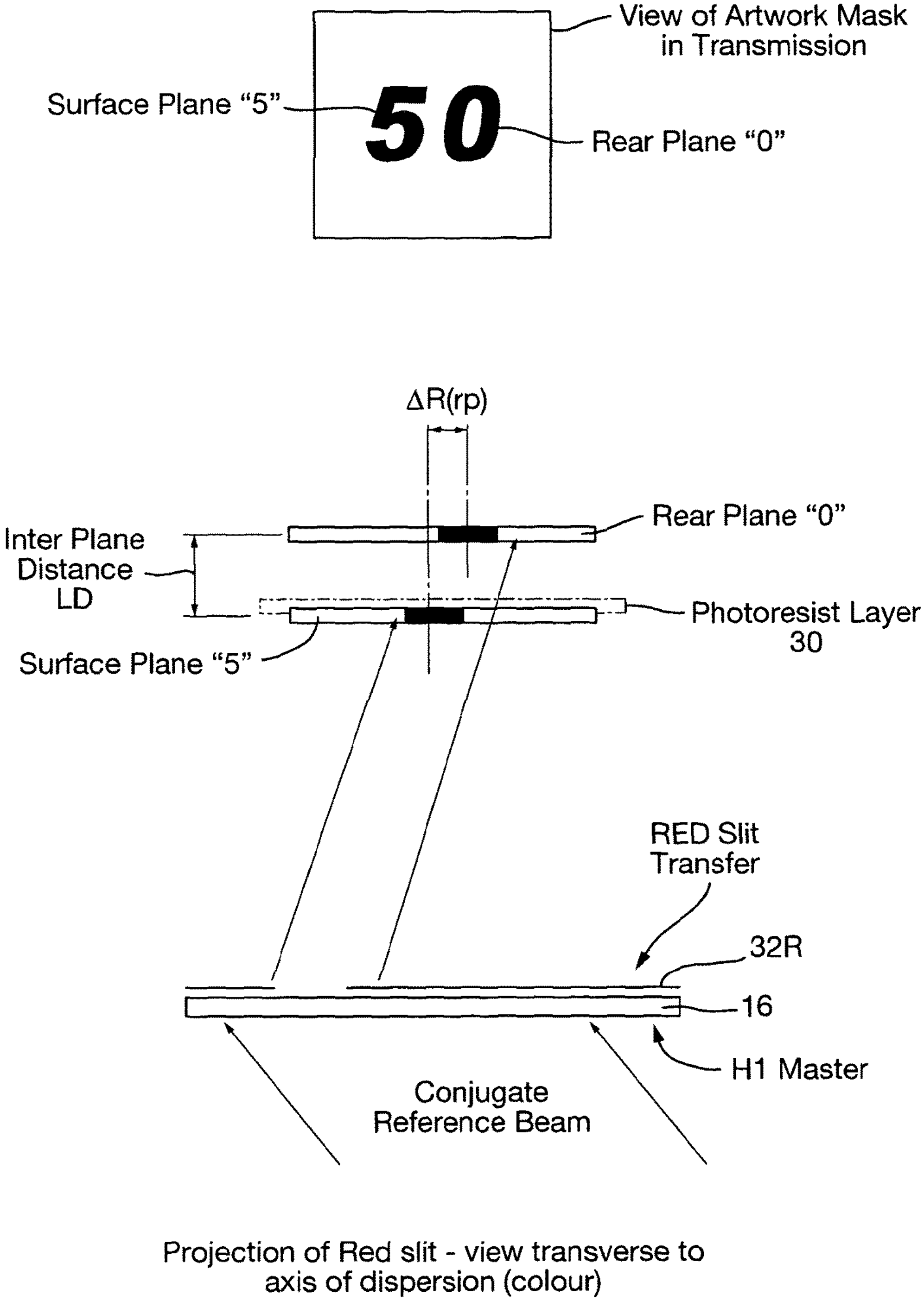
Figure 12C:
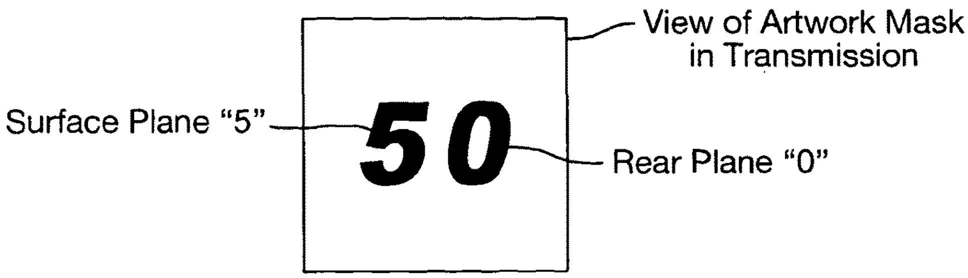
Figure 12C:
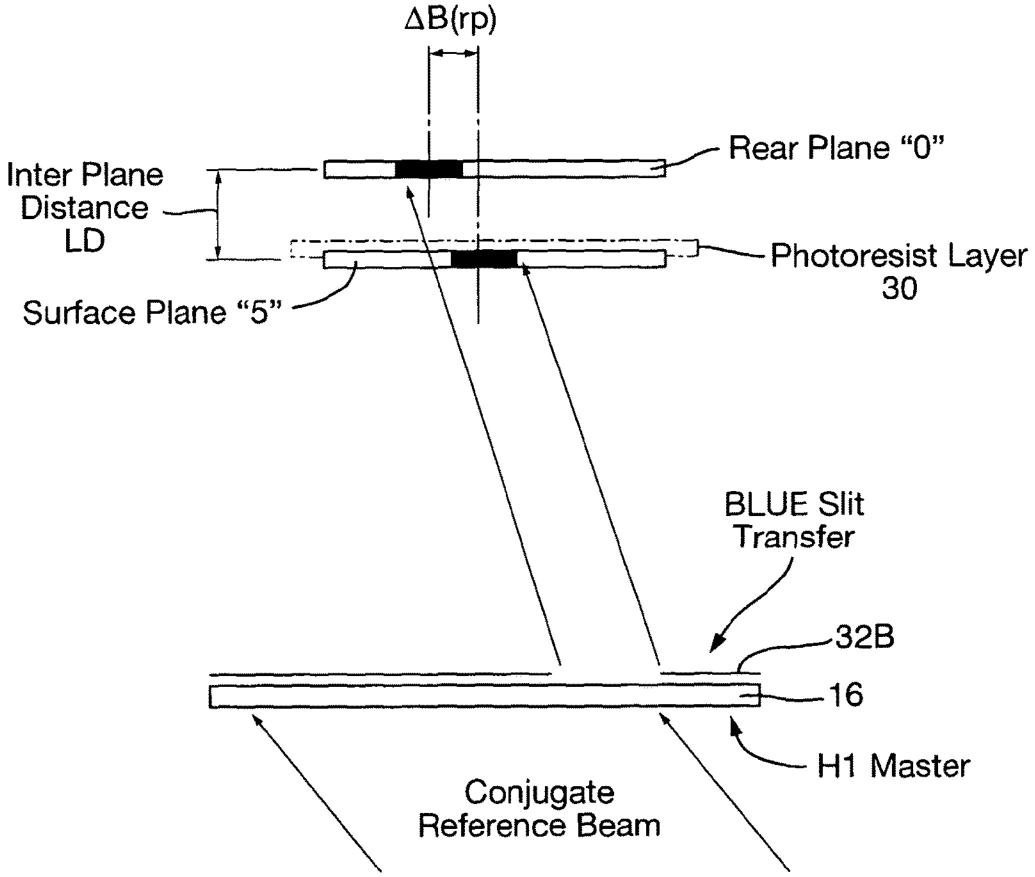
Figure 15:
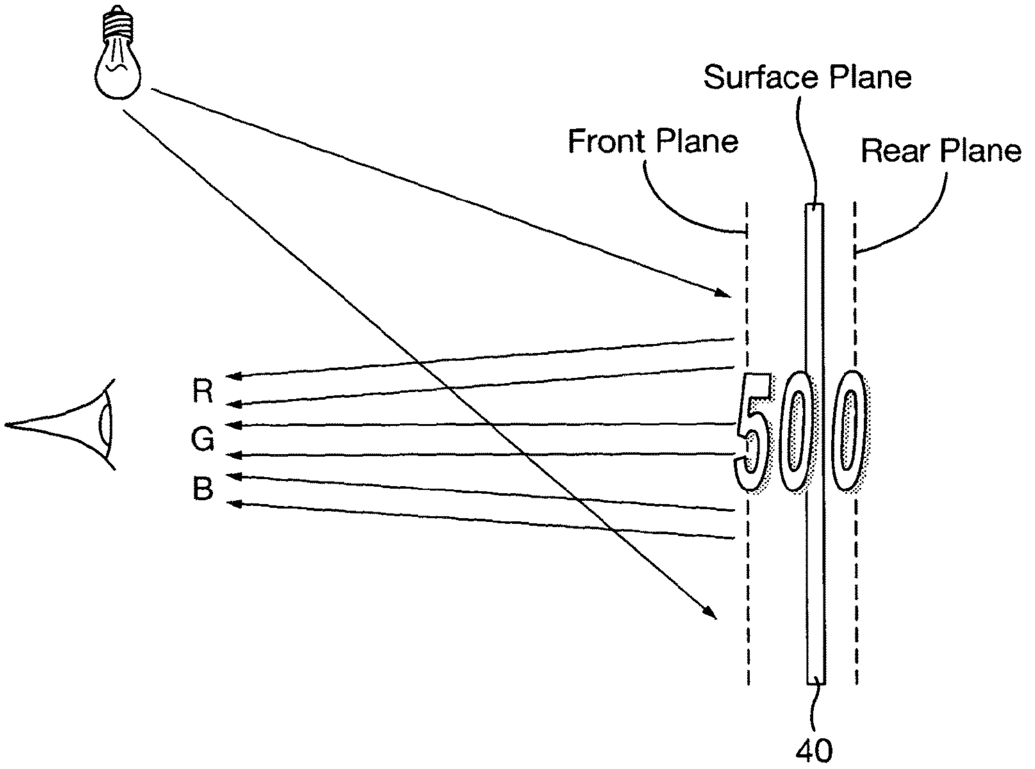
Figure 16:
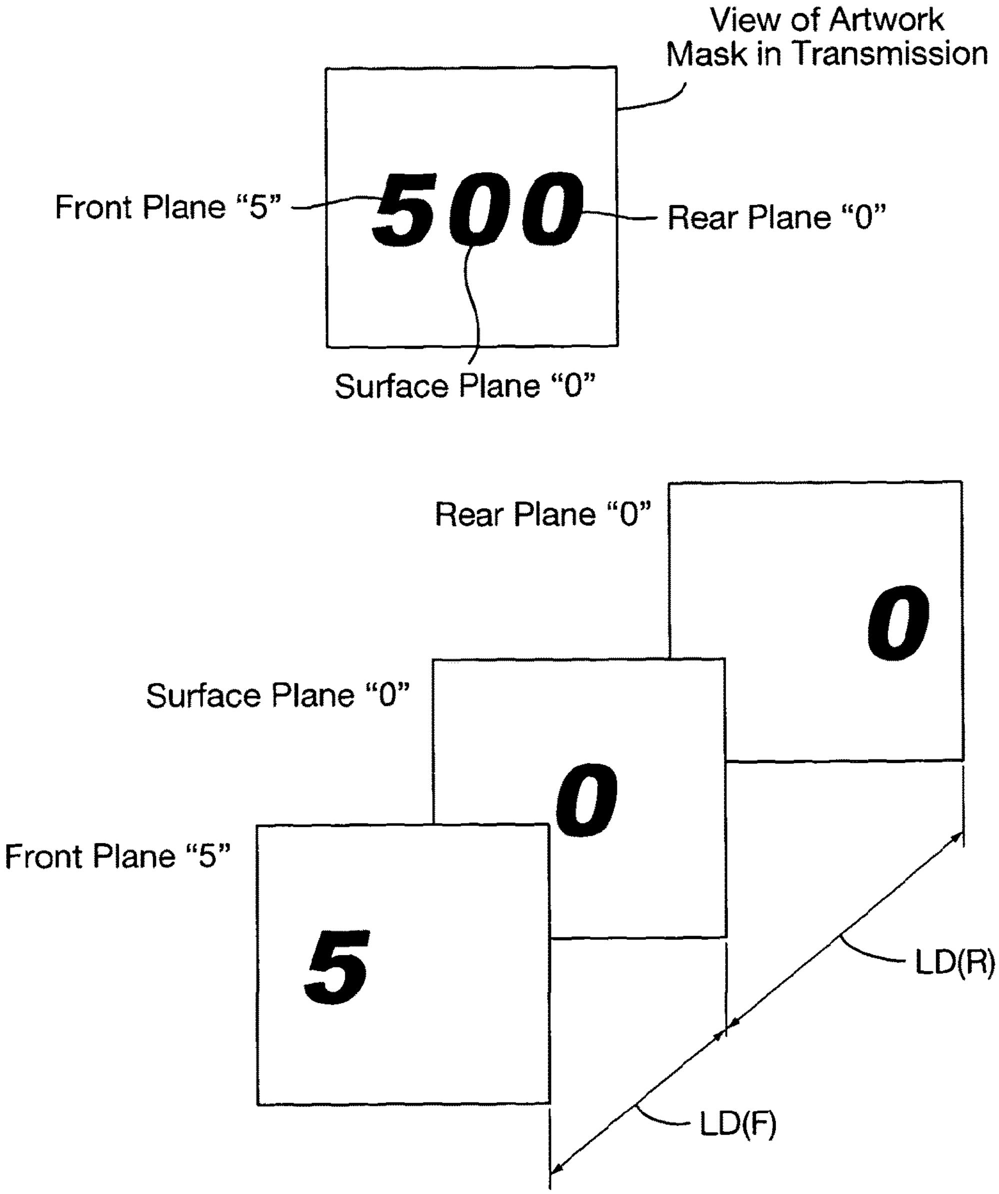
Figure 20A:
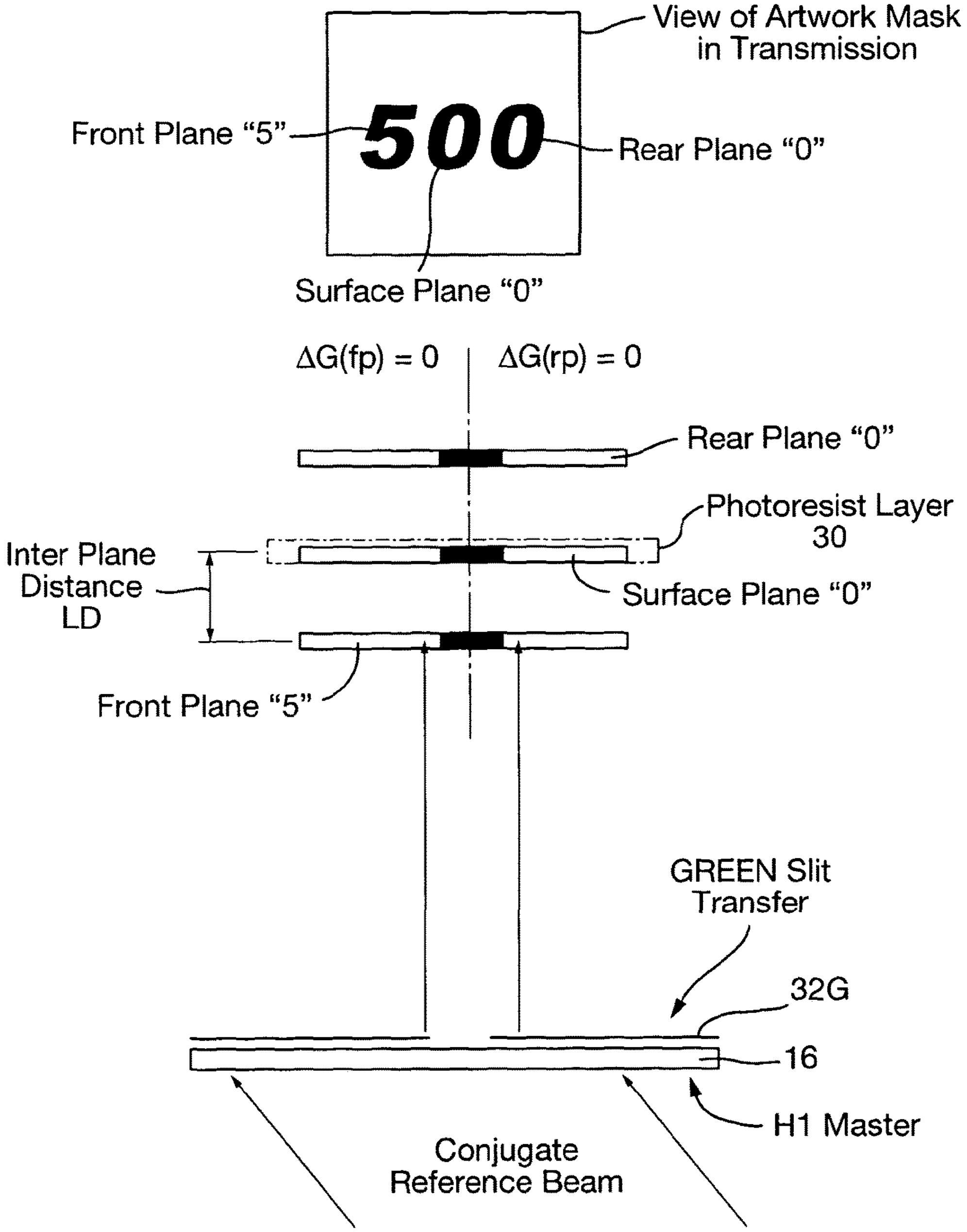
Figure 20B:
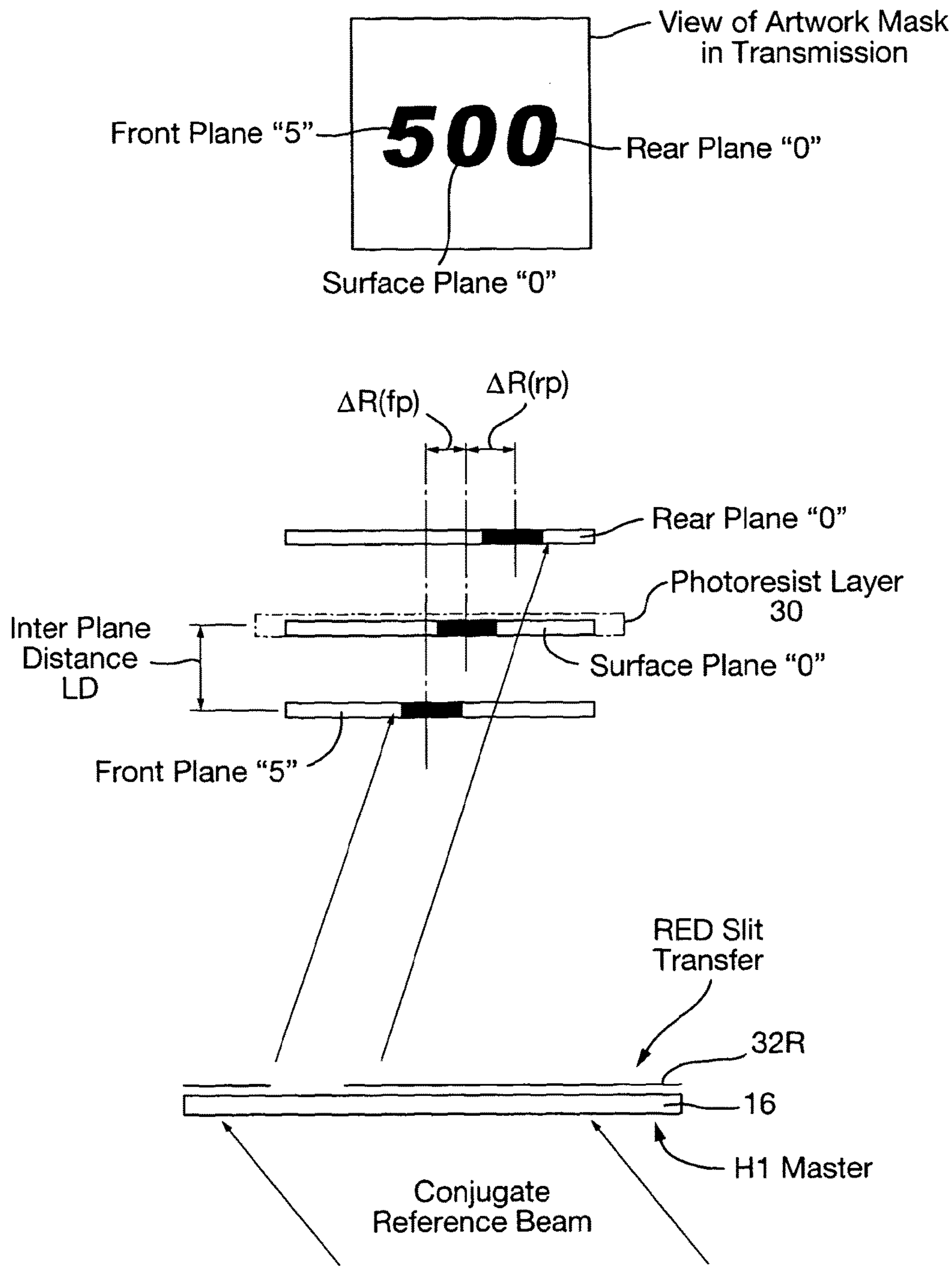
Figure 20C:
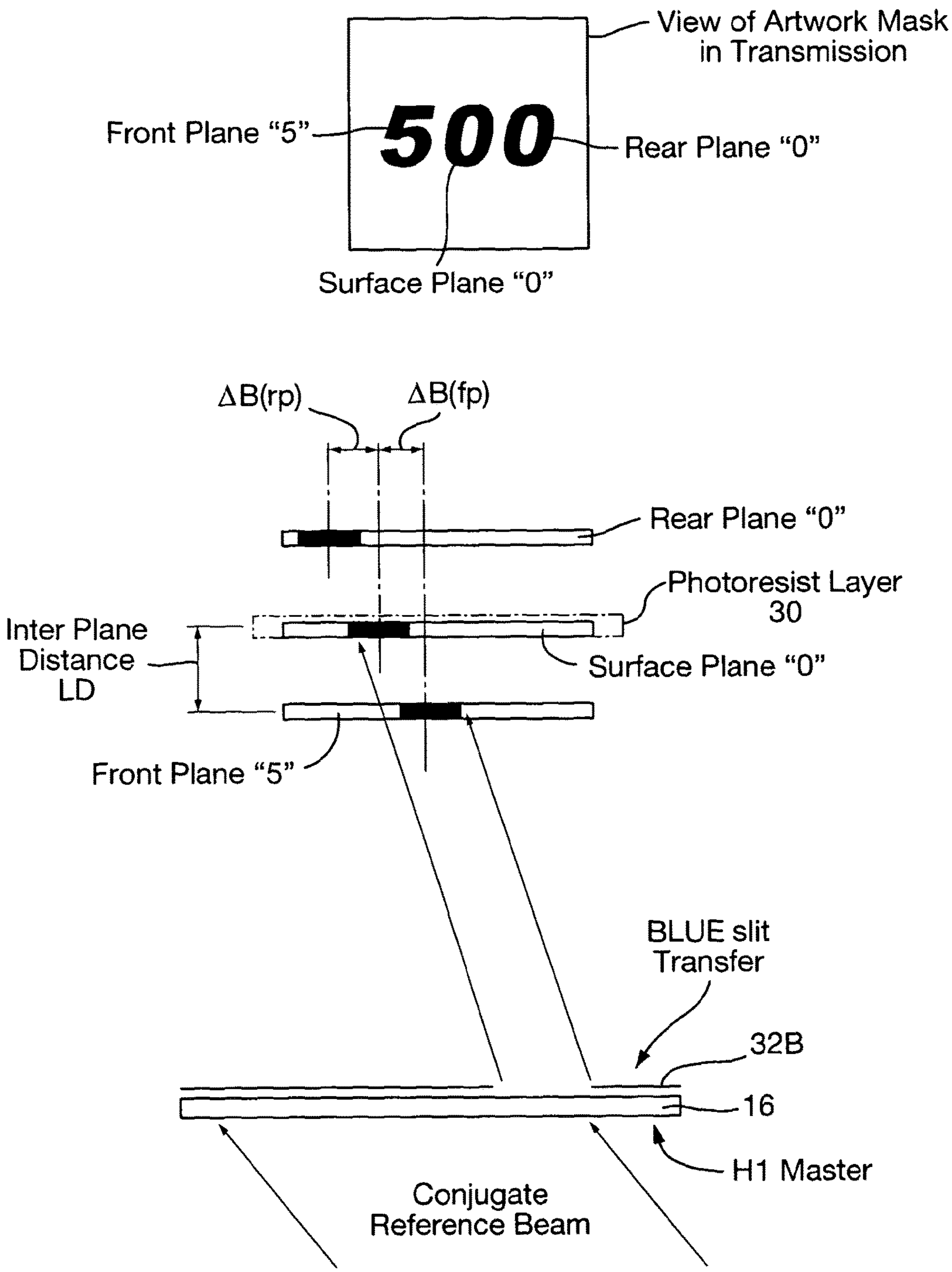
Figure 21:
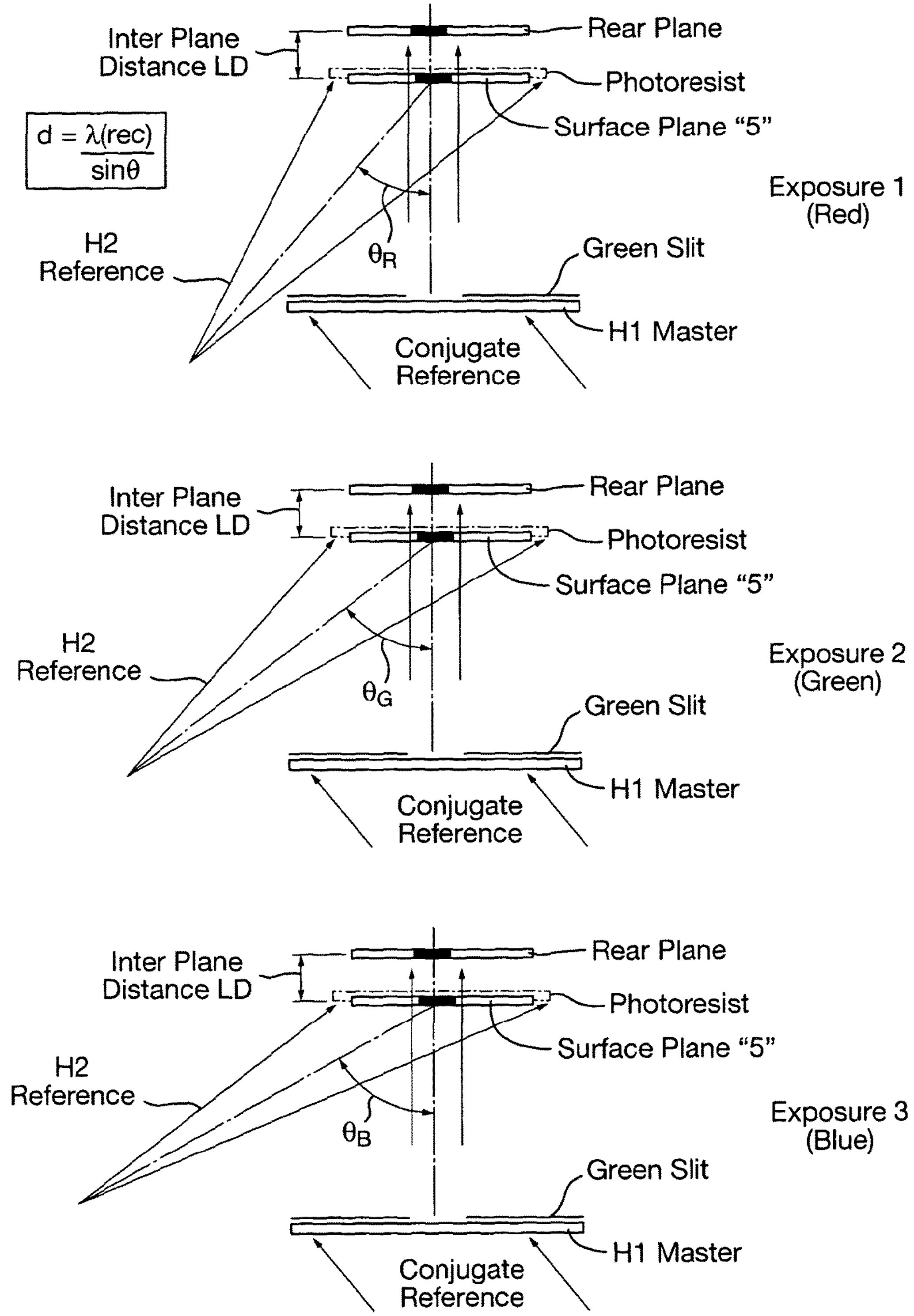

FIGS. 7 and 7*a* are similar to FIGS. 5 and 6 respectively but with achromatic symbols on a non-diffractive background;

FIG. 8 illustrates the basic geometry for recording H1 for a device of the type shown in FIG. 5;

FIG. 9 illustrates the H1 construction geometry when viewed along an axis transverse to the axis of parallax;

FIGS. 10*a*-10*c* are views similar to FIG. 9 but showing the geometries for recording each of the red, green and blue gratings respectively;

FIG. 11 illustrates the H2 recording geometry when viewed along an axis transverse to the axis of parallax;

FIGS. 12*a*-12*c* are views similar to FIG. 11 but illustrating the green, red and blue recording geometries respectively;

FIGS. 13 and 14*a*-14*c* are views similar to FIGS. 9 and 10*a*-10*c* but illustrating the H1 recording geometry for the example shown in FIG. 7;

FIG. 15 illustrates a further example in which symbols appear in three planes;

FIG. 16 shows the structure of the device in FIG. 15 in more detail;

FIGS. 17-20 illustrate the H1 and H2 recording geometries for the FIG. 15 example; and, FIG. 21 illustrates an alternative approach to manufacturing the security device using a single H1 slit.

Figure 2:
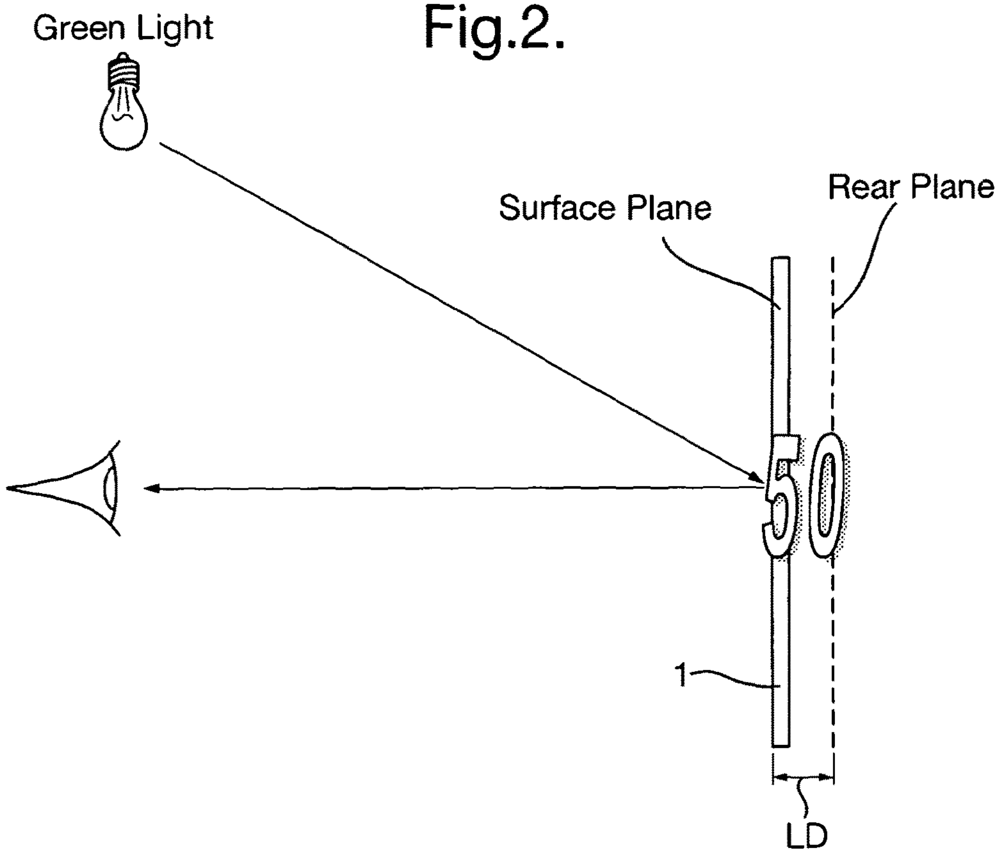
FIG. 2 and FIG. 3 illustrate the appearance of a hologram of the type described in WO 2005/069085 when viewed under monochromatic and white light respectively.

FIG. 2 shows an embossed surface relief hologram 1 of the type described in WO 2005/069085 which forms image elements '5' and '0' located on the surface plane (SP) and rear plane (RP) respectively which are separated by a distance LD. For simplicity of illustration, we further assume that both the 5 and the 0 have substantially the same grating periodicity. Given these device constraints, we next consider the situation wherein the said hologram is illuminated by substantially monochromatic light, whose colour we suppose to be somewhere in the green part of the spectrum for the purposes of illustration. As can be seen in the illustration when the hologram is tilted at an appropriate angle to the incident light (effectively tilt about the horizontal axis) then both the hologram image elements replay into the observer's eye. At other angles of tilt the holographically replayed light is not redirected into the observer's eye and neither image is visualised. If we return to the scenario wherein the hologram device is tilted about the horizontal axis such that it forms the correct angle of incidence with the illuminating light to replay the green image into the observer's eye and then proceed to tilt the hologram device about a vertical axis located within the plane of the device this causes the rear plane 0 to displace left to right (or east-west) relative to the surface plane 5 as described in WO 2005/069085. This relative displacement is known as parallax displacement PD and as explained in WO 2005/069085, the rate of PD is at least 6 mm/radian which in turn requires the inter-planar distance LD to be at least 6 mm.

Figure 3:
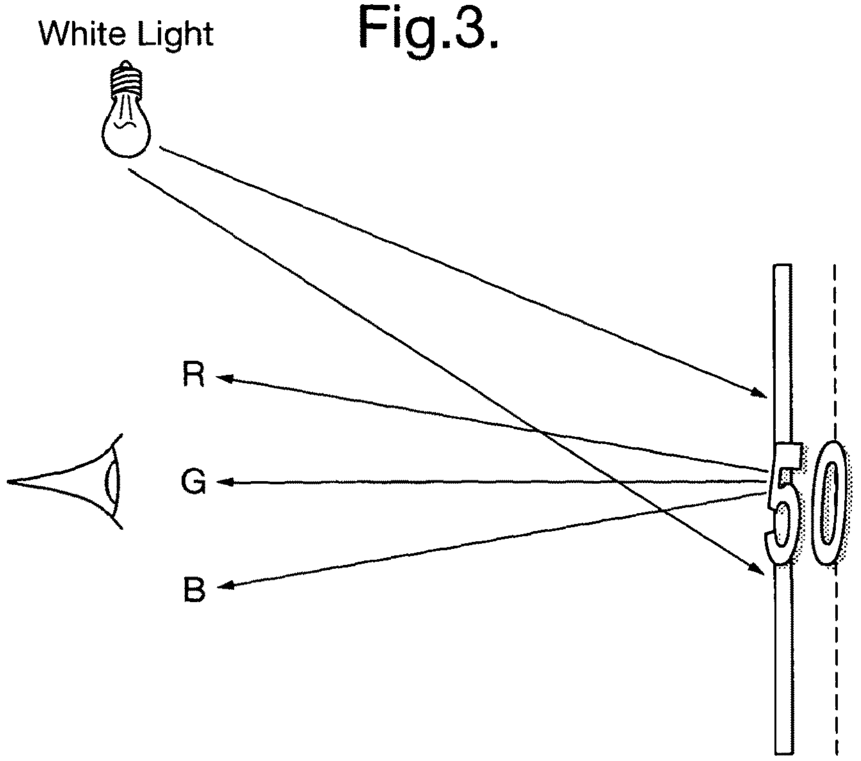

Suppose next the same device is illuminated by polychromatic or white light as shown in FIG. 3. The situation now differs in that in addition to the green holographic image replay, there is also holographic image replay in both the red and blue wavelengths (and at all intermediate wavelengths, but we have ignored these for simplicity). For each of these three wavelengths there will be a preferred angle of tilt wherein the hologram image is visualised in the red green and blue respectively. At each such preferred angle, those image colours not visualised will be as a consequence of them being replayed in a direction which fails to enter the observer's eyes.

At this point it useful to contrast this behaviour of the surface relief hologram with a Lippmann volume hologram wherein tilting the hologram about its horizontal axis causes the rear plane '0' to exhibit north-south parallax displacement relative to the surface plane '5', but the image replays in only one colour (as determined by the Bragg condition) i.e. the Lippmann hologram exhibits both vertical and horizontal parallax but at the expense of polychromatic replay under white light illumination. Whereas embossed surface relief holograms to ensure white light view-ability.

Figure 1:
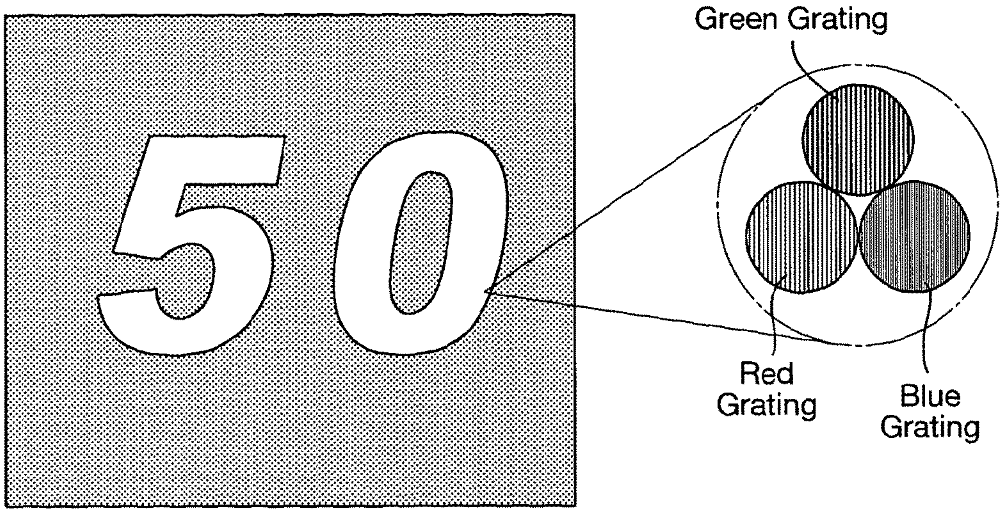
FIG. 1 illustrates a conventional 2D achromatic hologram.

Having considered the situation where a chromatic hologram of the type described in WO 2005/069085 is illuminated by white, we now consider the situation where we require the multi-planar 50 image to replay in what we consider is an achromatic manner. As for the conventional 2D achromat image described in FIG. 1, both image elements have to be comprised of a red, green and blue grating. However in contrast to the conventional situation where the three grating colours are located in three respective non-overlapping pixels or structure elements, we now arrange for the red, green and blue gratings to be superposed (i.e. fully overlap) at every point on the image element and not be spatially resolved into discrete areas during the origination. It is evident that this is not a strict requirement for the surface plane '5' however it is important for the '0' symbol which form a virtual depth image at least several millimeters behind the surface plane.

The reason being is that the continuous and interrupted holographic movement exhibited by a true holographic device requires a complex (and in mathematical series terms a continuous) superposition of grating components with progressively varying grating orientations. To achieve a true superposition of the red, green and blue gratings requires the method of holographic superposition of the respective red, green and blue interference patterns. Holographic methods will subsequently be described to provide this three colour superposition for surface and more especially non surface (i.e. rear and front/forward plane) image elements.

Figure 4:
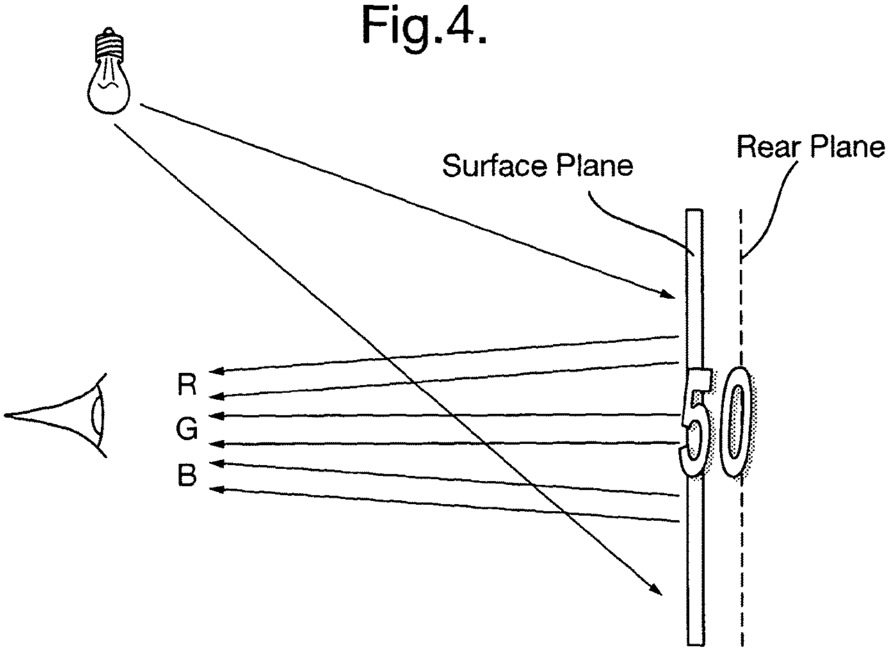
FIG. 4 illustrates a first example of a device according to the invention.

We start by showing in FIGS. 4 and 5, a simple example of the inventive achromat hologram device which comprises the image '50' wherein as before the '5' image element has an image plane located on the surface plane of the device (i.e. its image or plane of focus is coincident with the surface plane of the device) whilst the '0' image element has an image plane located a distance LD mm behind the surface of the device, wherein LD is sufficiently large to generate a rate of parallax movement PD relative to the surface plane image of at least 6 mm/radian of tilt. For this particular embodiment, this requires LD to be at least 6 mm.

As regards colour, both symbols/image elements are non-diffractive (i.e. they are appear black or specular reflective), whereas the diffractive background image or light pattern which surrounds these respective image elements will replay achromatically—that is a substantially colour neutral white to light grey. The resulting visual effect is that the non-diffractive image elements will exhibit relative parallax motion (i.e. they will appear as moving image masks against an achromatic background). This example is typical of what would be referred to in the hologram industry as a registered design in that the 50 image has a predetermined position relative to the boundaries of the device. Such designs are typically exhibited in what are referred as patch type product formats (label or hot-stamped) and less typically wide (>8 mm) strip or stripe format (again label or hot-stamped).

By comparison FIG. 6 shows a corresponding example of what would be referred to as a non registered design wherein the multiple repeating nature of the image means that registration to the visible boundaries of the hologram is not especially advantageous. Such non registered designs are more typically (but not exclusively) associated with narrow strip or thread formats wherein the hologram is applied or integrated into document without concern for the positioning of the image elements relative to the application die or substrate windows (in case of a thread or other forms of security document with a substrate aperture). In this case, the symbols are again non-diffractive and the background is achromatic.

It should be stressed that in both the above examples a normal colour or chroma could be provided in the 5 and the 0—however in respect of the depth symbol 0, a particular benefit is the highest possible colour contrast achieved by a black symbol and a near white background. This optimal contrast helps visually mitigate the image diffusion effects experienced by the rear plane symbol when viewed under diffuse or extended light sources.

FIGS. 7 and 7*a*, show the converse scenario for registered and non-registered design, wherein at least the rear plane image element or image elements (0's) are substantially achromatic and are originated to replay against a specular non-diffractive background. Again the objective is to maximise the contrast between image and background (which in the ideal scenario would be white on black) to maximise visual clarity of the rear plane features under diffuse light. However consistent with this is the possibility of providing the surface plane element or elements in a conventional diffractive colour or chroma.

Methods of Construction for Two Plane Devices

The various origination methods described are a specific adaptation of a more general methodology known in the art as Benton white light rainbow holography and in particular incorporate the steps of creating a first intermediate transmission hologram (known as a H1) and then utilising that intermediate hologram (by illumination with a conjugate reference beam) to generate a second surface relief hologram (invariably in resist) known as the H2. For a detailed description of this method, see 'Practical Holography' by G. Saxby.

To begin with FIG. 8 shows a schematic of the H1 recording process.

The holographic object generating assembly consists of a transmissive diffuser 10, a first artwork transmission mask 12 corresponding to the rear plane image (in this case 0) and a second artwork transmission mask 14 corresponding to the surface plane image (in this case 5). With the second artwork transmission mask 14 being closer to the H1 recording plate 16 than the first mask.

Following the propagation of the object light through the recording geometry, we start by allowing coherent laser light (typically 457 nm) through the diffuser 10, wherein it first impinges on the first artwork mask 12, where the wave-front in the region defined by the rear plane symbol, it is locally blocked. Following transmission through the first mask 12, the diffuse light wave-front then impinges on the second artwork mask 14 where a further part of the wave-front is blocked by the surface plane symbol before propagating towards the H1 plate 16 where it exposes either the red, green or blue strip of the H1 (shown dotted) as defined by a further mask. These exposure strips are typically referred to as Benton rainbow slits. There length or dimension along the parallax axis we refer to as the slit length SL (this determines the horizontal parallax or viewing angle). Whereas the position of each strip along the direction labelled in the diagram as the axis of dispersion determines the colour. In the diagram the strips are labelled red, green and blue.

In order to generate a holographic interference pattern it is further necessary to illuminate the H1 plate 16 with a reference beam RB (typically a plane wave) such that RB overlaps with the object beam within the recording medium of each strip or slit to generate the requisite holographic interference pattern pertaining to that object field.

FIG. 9 shows the H1 construction geometry when viewed along an axis transverse to the axis of parallax. Here we see explicitly that that the mask artwork corresponding to the surface and rear plane artwork will exhibit parallax displacement as we move our direction of observation from east-west across the H1 slit. The slit mask is shown at 20. The relative parallax displacement PD between the two image elements being determined by expression $$PD = 2 \times LD \times \sin\theta$$

where $\sin\theta = SL/2\ (SQRT[(F+LD)^2 + SL^2/4]$

Also see a more detailed discussion of this in WO 2005/069085.

Considering next FIGS. 10*a, b* and *c*, these show the recording geometry along an axis transverse to the axis of dispersion (in plainer language often called the rainbow or colour axis).

Considering first FIG. 10*a*—here we see the same holographic object generating assembly as before. However along this axis, the object wave-front is only allowed to fall on a restricted section of the left hand side of the H1 by using a slit mask 20R, which when we follow the process through to the creation of the H2 results in this slit generating what we call our red holographic surface relief grating structure. Similarly FIGS. 10*b* and *c* show those locations on the H1 recording surface which pertain to the green and blue grating using slit masks 20G and 20B respectively. It should be noted that the H1 recording geometry for the green slit is distinct from that of the red and blue slits in that the image artwork directly faces (i.e. is in line) with the green slit, whereas the red and blue slits are not in line with the image artwork (i.e. the line bisecting the image artwork and the slit forms an angle with the plane of the H1 which is less than 90 degrees).

Having considered the H1 recording geometry, we next show in FIGS. 11 and 12, the corresponding transfer or reconstruction geometry needed to generate the H2.

Starting with FIG. 11, this shows the H1-H2 transfer arrangement, as seen when viewed along an axis transverse to the axis of parallax. The first stage is to cause the red, green and blue images previously recorded in the H1 16 to project on to the plane of the H2 recording material 30, this being effected by illuminating the reverse side of the H1 with a conjugate reference beam. When the conjugate reference interacts with the previously recorded interference pattern, the process of diffraction re-directs in energy terms a fraction of the incident wave-front to form and project an image of the original holographic object onto the plane of the H2 recording material 30. Here it would overlap with the H2 reference beam to form a second interference pattern in the H2 recording material. Typically for the geometry shown, the H2 reference beam would have an incident wave-vector which lies in a plane transverse to the axis of propagation (i.e. as drawn in a plane transverse to the page). It should be noted that when viewing the H2 recording geometry along an axis transverse to the axis of parallax, the red, green and blue slits formed in mask 32 project the image generating wave-fronts will be essentially coincident and as a consequence the surface plane and rear plane image elements will appear to precisely overlap thus generating a complex holographic grating structure which is a superposition of respective red red, green and blue holographic grating structures and which as a consequence has the desired achromat replay characteristics described earlier.

In the other viewing geometry, which is transverse to the colour or dispersion axis, the situation is more complex in that the respective rear plane image elements pertaining to the red, green and blue slits, when holographically reconstructed or projected from the H1 on to the plane of the H2, do not ordinarily overlap in the desired precise register.

To illustrate this we first consider FIG. 12*a*, which show the H1-H2 reconstruction pertaining to the green H1 slit formed in slit mask 32G. As discussed before in reference to FIG. 10*b*, the green H1 slit and the surface plane and rear plane artwork elements are all in line—that is a line drawn ortho-normal to the green H1 slit passes substantially through the centre of the surface and rear plane artwork.

Now within this recording geometry the surface of the H2 recording plate 30 (i.e. photo-resist layer) is positioned to be coincident with what we have previously labelled the surface plane image element, whereas the rear plane forms a focus a distance LD behind the surface plane. Next as discussed previously a second (relief generating) holographic interference pattern is generated within the photo-resist by allowing the image formed on the photo-resist by the green slit to overlap with the H2 reference beam. The angle $\alpha$ formed between the reference and object beam within the plane of dispersion (along with the wavelength $\lambda$ of the illuminating light) substantially determines the periodicity of the interference fringes and consequently the grating periodicity.

Finally and importantly because the green slit directly faces the image artwork then as a consequence the surface plane and rear plane artwork are projected onto the resist in-line. Thus for the green hologram component recorded into the H2, the surface and rear plane image elements maintain the same north-south register as existed between their respective transmission masks during the H1 recording process. If we denote the loss of register between surface and rear plane artwork as ΔG (rp). Then for the case of the green slit H1 recording geometry ΔG (rp)=0

However if we next consider the H2 recording geometry for the red slit (FIG. 12*b*) formed in slit mask 32R we see that the rear plane image projects onto the H2 recording plate 30 by an amount−ΔR (rp) lower than its surface plane counterpart. In other words, in the north south direction the red rear plane component will appear low or out-of-register from its intended position by an amount−ΔR (rp). This is undesirable as we require the red, green and rear plane elements to be in perfect mutual register. To correct this error we apply a correction+ΔR (rp) to the rear plane artwork transmission mask when recording the red H1 slit.

Similarly in FIG. 12C, we show the H2 recording geometry for the blue slit or image element formed in slit mask 32B. In this case the rear plane blue image element projects high by an amount and thus to maintain register with green rear plane image element it is necessary to apply a correction−ΔB (rp) to the rear plane artwork transmission mask when recording the blue slit.

Thus in summary by applying the appropriate register correction to the rear plane artwork transmission masks during the H1 recording process we can ensure that during the H2 recording process all 3 rear plane colour components project back in register.

During the H2 recording our preferred method is to allow all three slit colours to project onto the H2 recording material simultaneously and in precise overlap and then further allow this superposition of the three image colours to then overlap with the reference beam to generate a coherent superposition of the three respective interference patterns.

We will now describe the H1 recording configuration for the case where the hologram device comprises achromatic image elements in a non-diffractive background (or less preferably a conventional chromatic background).

Figure 13:
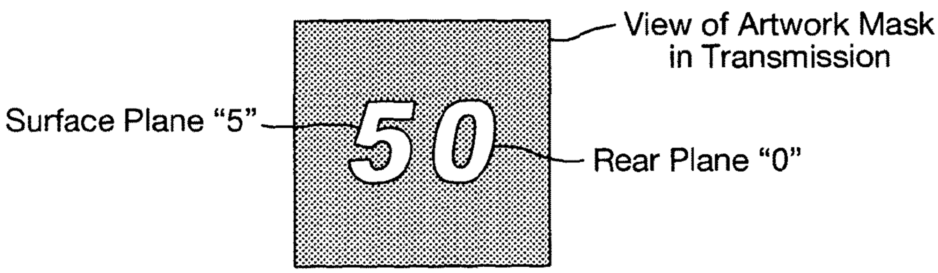
Figure 13:
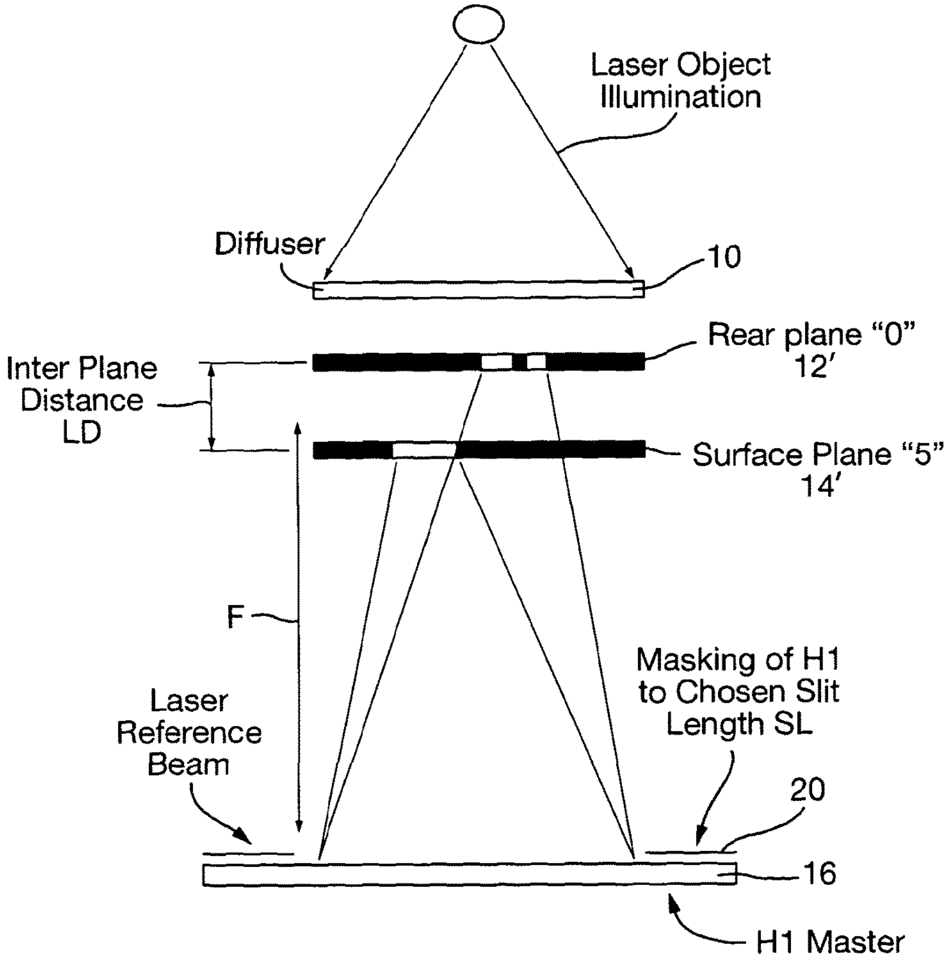

FIG. 13 shows the H1 recording geometry along a viewing axis transverse to the axis of parallax. The same references are used as in FIG. 9, the only difference being that the image elements within the artwork masks 12',14' correspond to regions of transparency against an opaque surround.

Figure 14A:
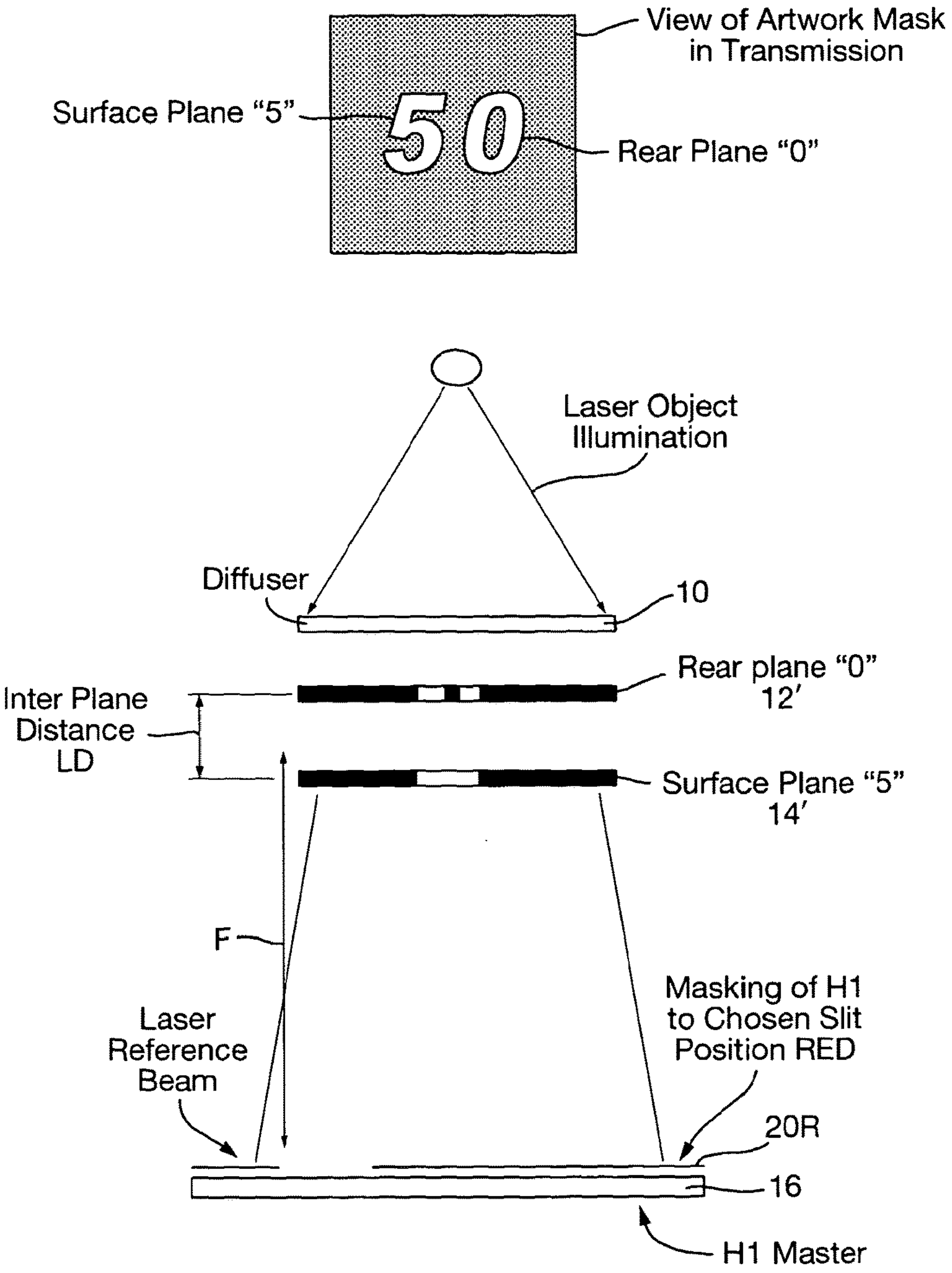
Figure 14B:
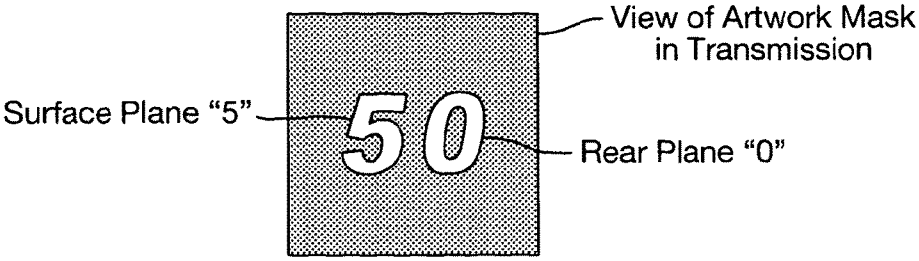
Figure 14B:
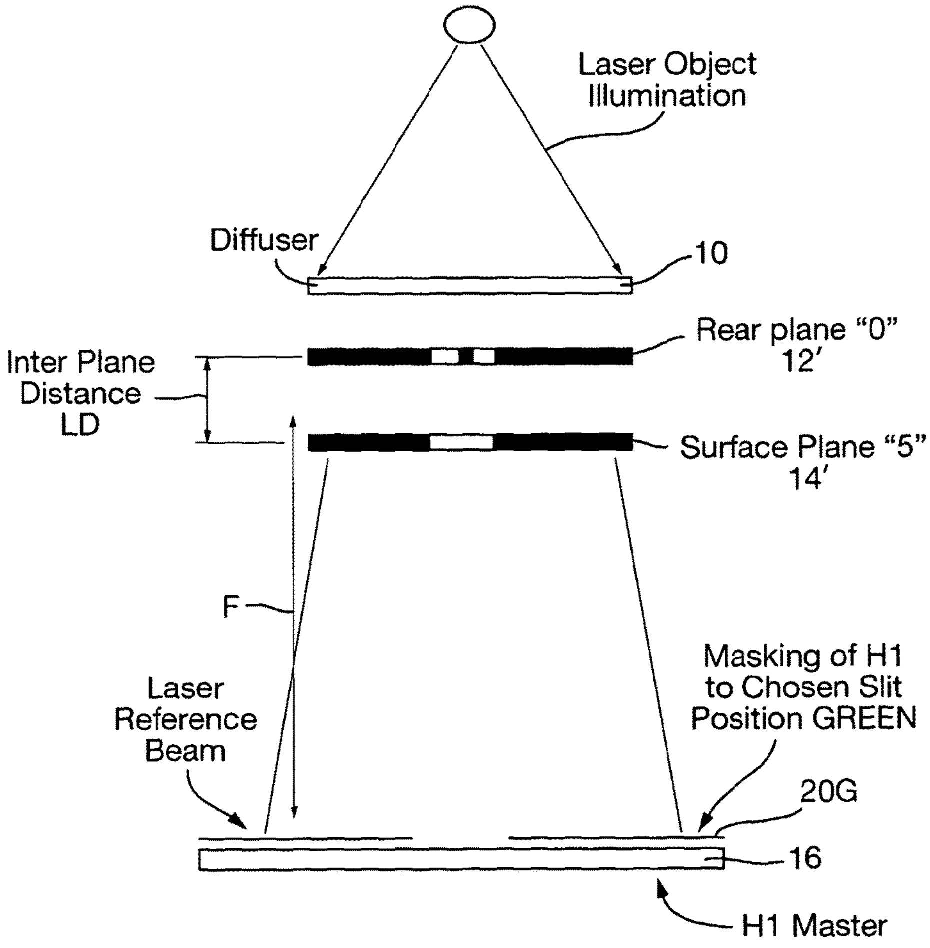
Figure 14C:
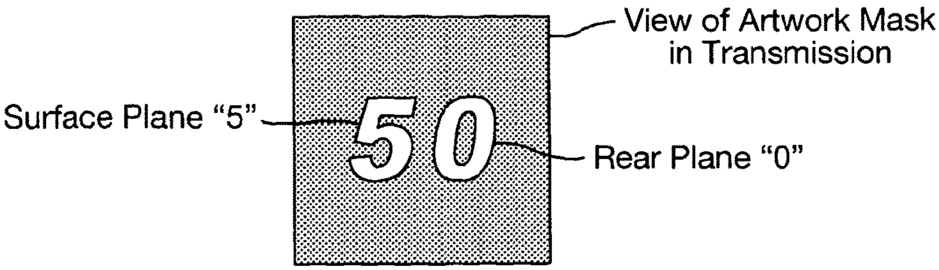
Figure 14C:
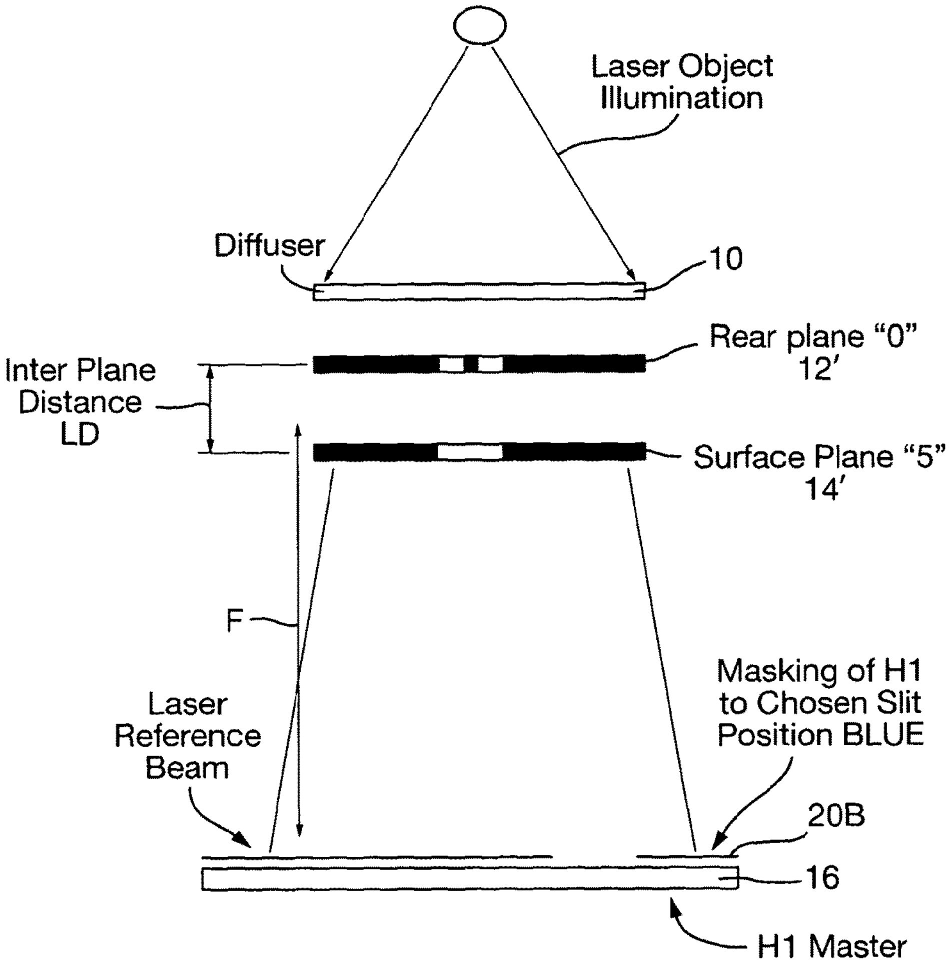

FIGS. 14*a, b* and *c* correspond to FIGS. 10*a* to 10*c* but show the H1 recording geometry of FIG. 13 along a viewing axis transverse to the axis of dispersion—for the red, green and blue recordings respectively. These Figures again differ from 10*a, b* and *c* only in the nature of the transmissive artwork masks, in that the image elements within the artwork masks 12',14' correspond to regions of transparency against an opaque surround.

Three Layer/Plane Hologram Device where in the Additional Plane is Located Closer to the Observer than the Surface Plane We first illustrate this device by reference to FIG. 15, which shows a side-on schematic of three layer achromat hologram, comprising of the three digit symbol '500', wherein we see that the central digit '0' is located on the surface plane of the device 40 and the right most digit '0' forms a virtual image behind the surface plane, which as before we call the rear plane. However in contrast to the previous examples the left most digit '5' forms a real image which from the observer's view point sits in front or forward of the surface plane, which henceforth we refer to as the front plane. As we have discussed and illustrated before, when the device is illuminated by polychromatic (more particularly 'white') light, those portions of the hologram containing complex holographic or diffractive relief will at a particular angle of tilt simultaneously replay red, green and blue light rays into the observer's eye such that those portions of the image appear substantially achromatic.

FIG. 16 shows one type of three layer achromat hologram in more detail, comprising the three digit symbol '500'. Specifically in this example the denominational image elements are non-diffractive (i.e. specular reflective or which some might more simply be black). We also show that the inter-planar separation between the surface plane and the rear plane is labelled LD(R), whilst the inter-planar separation between the surface plane and front or forward plane is labelled LD(F).

As before it is important that rate of relative parallax displacement is at least 6 mm per radian—however in contrast to the two layer case, here the relative parallax displacement is between the forward and rear plane and not the surface plane. Thus the effective depth is the sum [LD(R)+LD(F)]. The benefit of sharing the parallax motion between the front and rear plane is that we can achieve the same parallax motion or perceived depth as the two layer system but with the front and rear plane image elements requiring only to be about half the distance behind (or in front of) the surface plane. Since the image diffusion or smear experienced by hologram image elements is proportional to their distance from the surface plane, it follows that a three layer system allows can provide the same amount of parallactic movement as a two layer/plane but with the moving image elements experiencing only half the image diffusion or smear under diffuse light.

It should be recognised that whilst we have chosen in FIG. 16 to present the specific case of a three plane achromat hologram wherein the image elements are registered to the boundaries of the hologram, it should be apparent that the same benefits and recording arrangements will apply to a non registered image pattern which would be the three plane counterpart of FIG. 6.

It should also be recognised that whilst FIG. 16 illustrates a scenario where the image elements are non-diffractive and visualised against a diffractive achromatic back-ground, the converse situation where achromatic image elements (especially front and rear plane) are visualised against a non-diffractive background (as per the two plane devices shown in FIGS. 7 and 7*a*).

Figure 17:
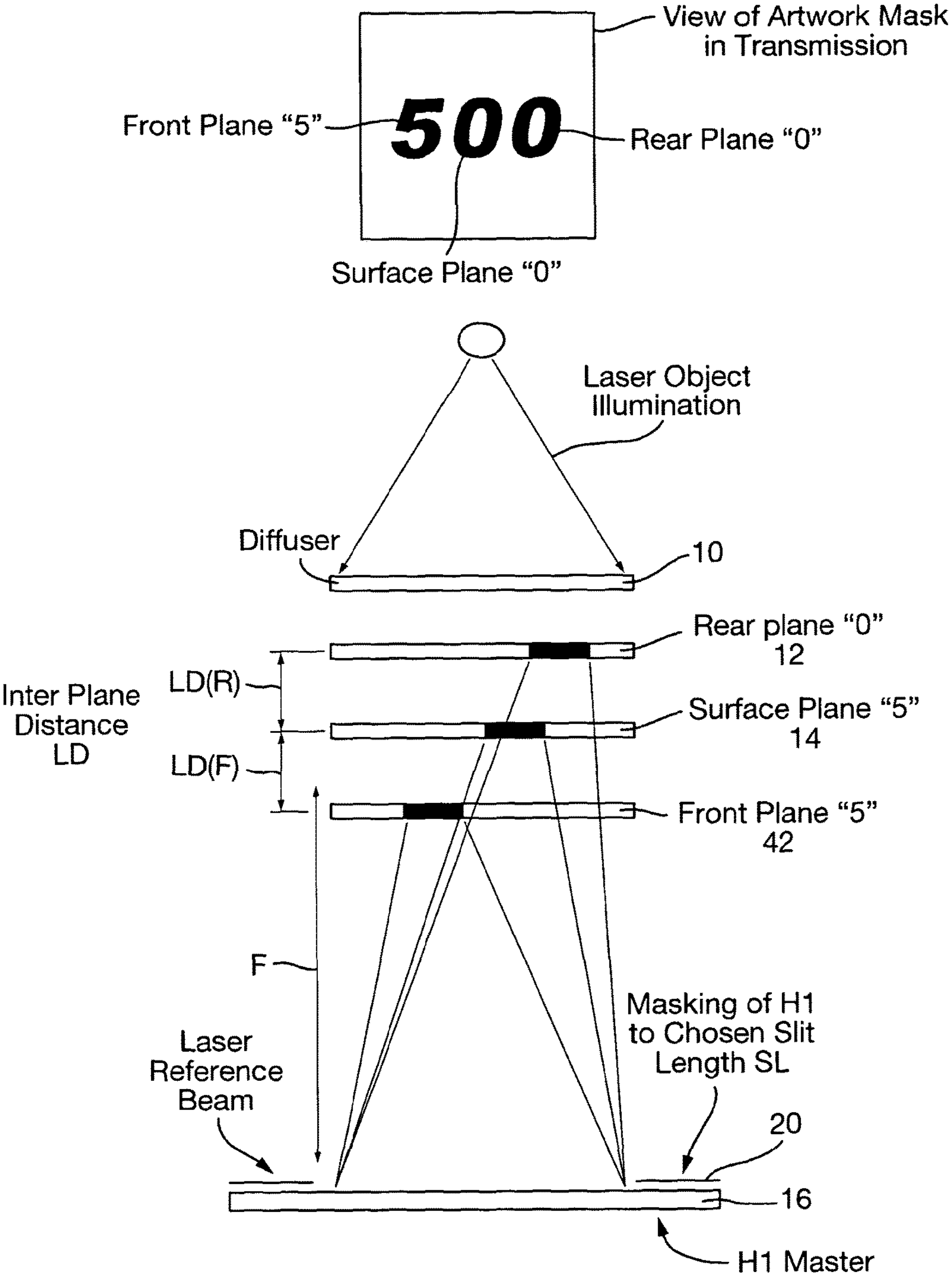

Considering next the arrangement for H1 recording, we first consider FIG. 17, which shows the H1 construction geometry when viewed along an axis traverse to the axis of parallax. This arrangement differs from its two plane counterpart (FIG. 10) in that the holographic object light field is formed by the laser object illuminations passing through three transmissive artwork masks 10,14,42 (preceded of course by the diffusing element 10). Here again we see explicitly that that the artwork masks corresponding to the front 42, surface 14 and rear 12 plane artwork will exhibit parallax displacement relative to each other as we move our direction of observation from east-west across the H1 slit. In the light of preceding discussion it follows that:

the relative parallax displacement PD (R) between surface and rear plane artwork masks and the relative parallax displacement PD (F) between surface and front lane artwork masks will be determined by the respective expressions $$PD(R)=2\times LD(R)\times\sin\theta^{R}$$

where $\sin\theta^{R}$=SL/2 (SQRT[(F+LD(R))$^2$+SL$^2$/4]

and $$PD(F)=2\times LD(F)\times\sin\theta^{F}$$

where $\sin\theta^{F}$=SL/2 (SQRT[(F−LD(F))$^2$+SL$^2$/4]

Note since the forward and rear plane parallax displacements will be in opposing directions relative to the surface plane (for example when the rear plane image appears to move to the right of the surface plane element, the forward plane elements appears to move to left), it follows that the total net parallax displacement between the forward and rear planes is given by the sum [PD(R)+PD(L)].

Figure 18A:
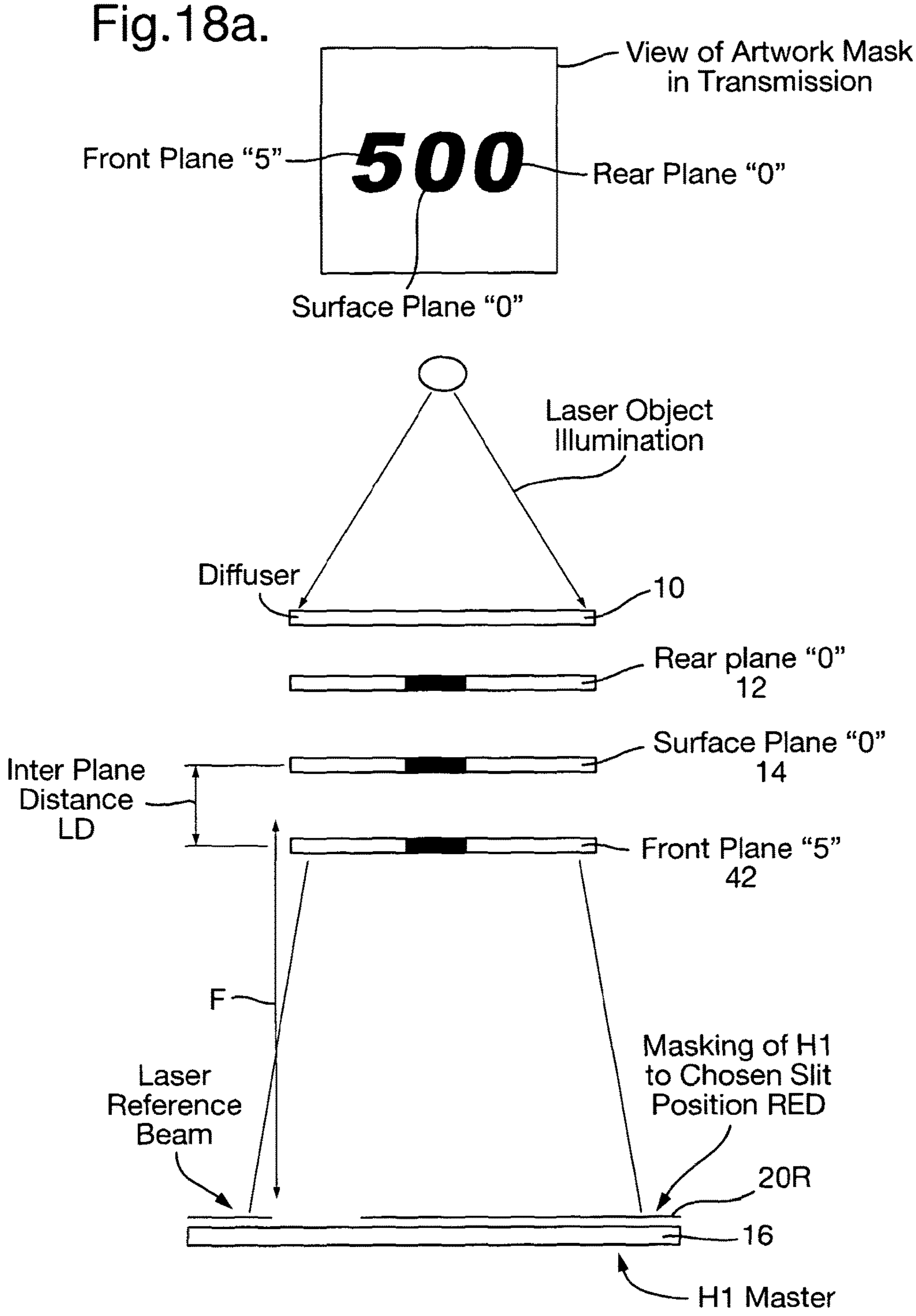
Figure 18B:
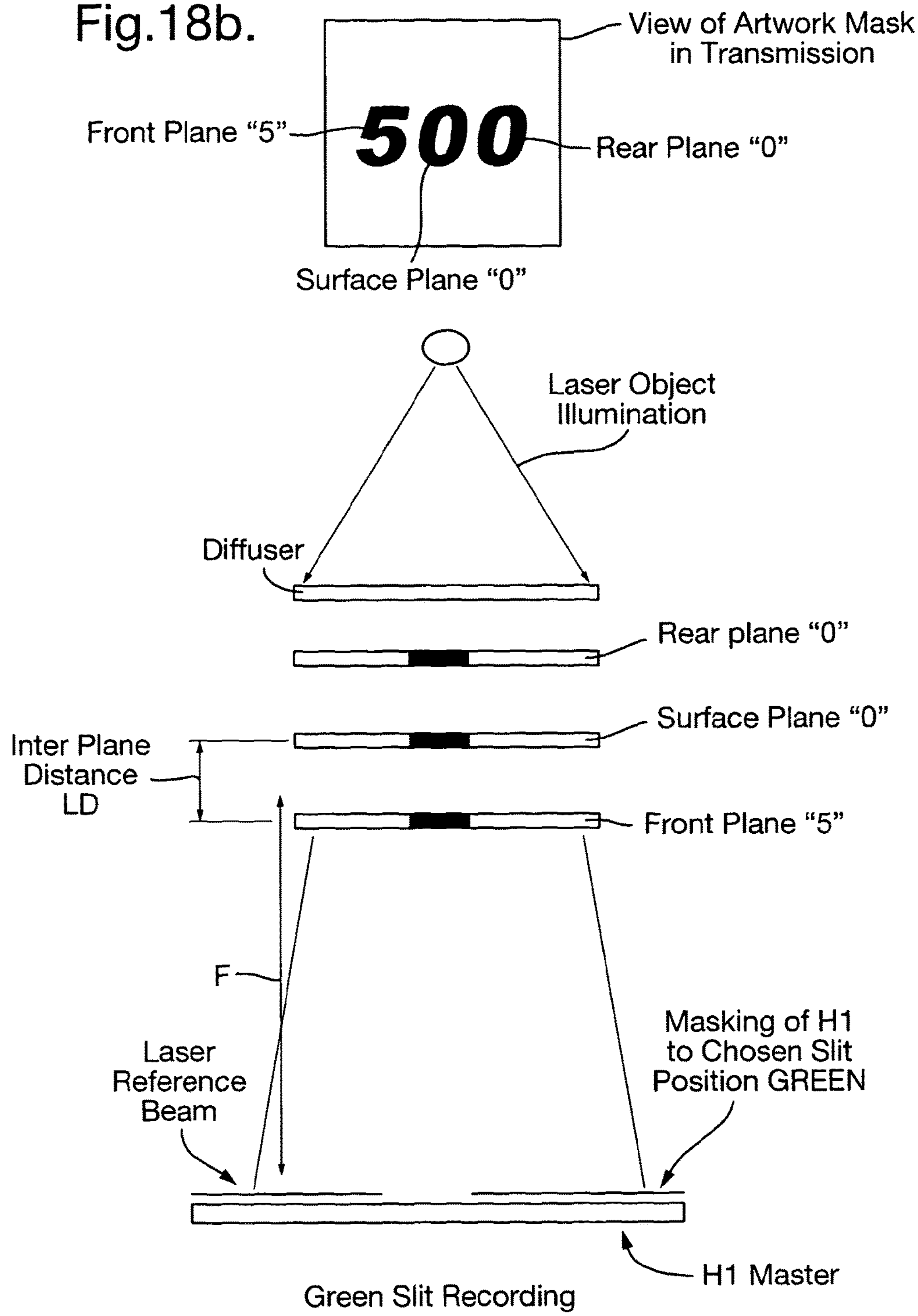
Figure 18C:
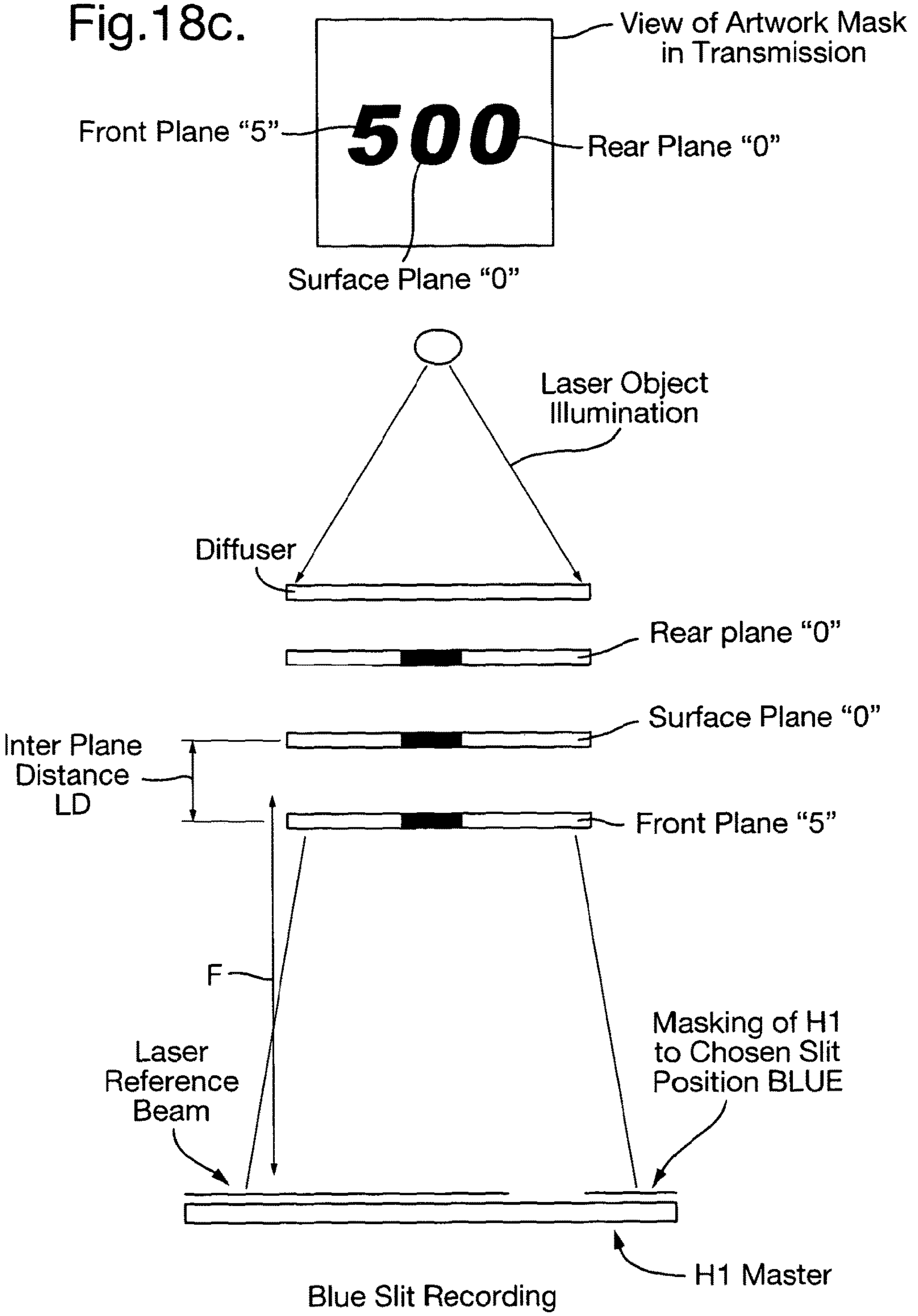

Next FIGS. 18*a, b* and *c* show the three plane H1 recording geometry or arrangement viewed along an axis transverse to the plane of distortion for the red, green and blue exposures respectively. As before, the green slit found in mask 20G (FIG. 18*b*) will be positioned such that it directly faces the artwork elements (i.e. a line passing through the centre of the artwork elements and the green slit will be essentially perpendicular to the plane of the artwork masks and the H1), whereas the red and blue slits formed in masks 20R,20B (FIGS. 18*a* and 18*c*) will view the artwork masks at an angle. A consequence of this is that, for both the red and blue H1 slit recordings, it will necessary to apply separate positional or registration off-sets to both the forward and the rear plane artwork masks, in order that when the blue and red slits are reconstructed (alongside the green slit) to generate the H2 image, the forward, surface and rear plane image elements have the same spatial or positional relationship as those present in the green image component. Because of the registration off-sets that must be applied to the red and blue artwork it follows that three colour slits must be sequentially exposed.

To more fully appreciate the need for the registration offsets that must be applied to the red and blue slits artwork masks; we next consider the H2 construction geometry for the red, green and blue slits.

Figure 19:
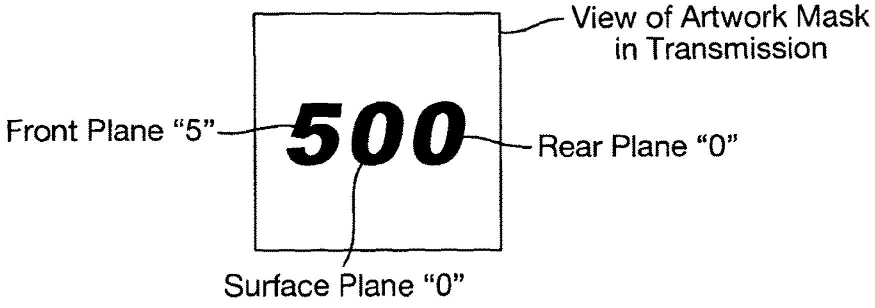
Figure 19:
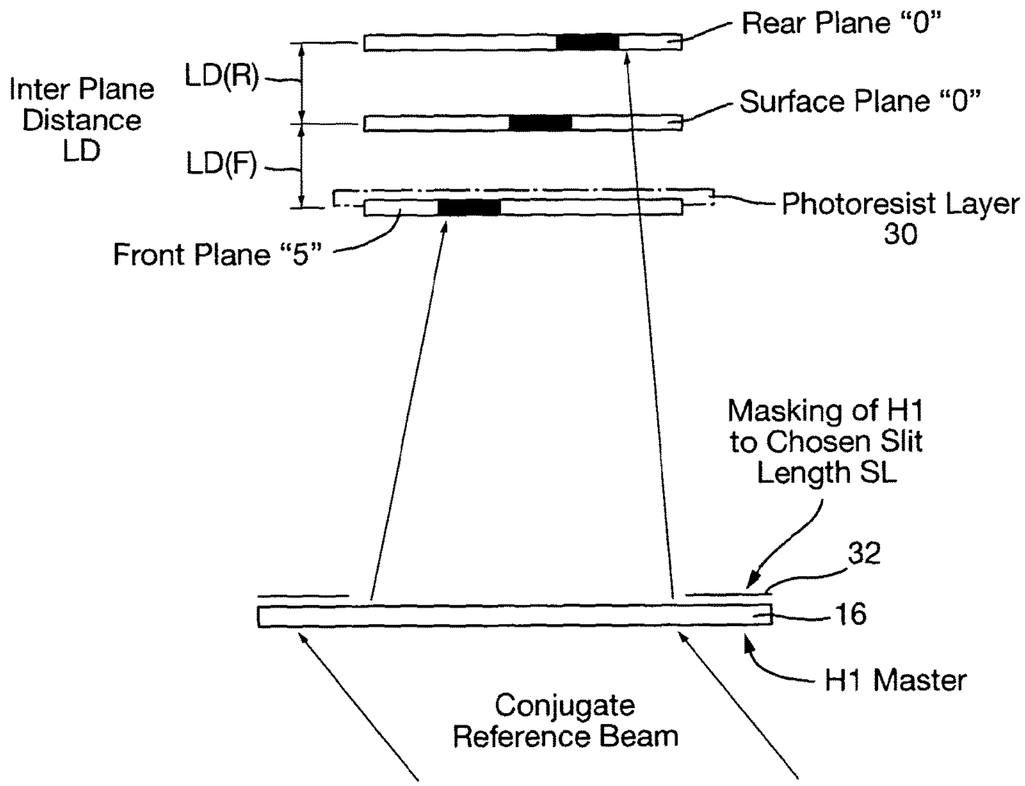

Consider FIG. 19, which shows the H1-H2 recording geometry as seen from a viewing direction transverse to the plane of parallax and is similar to the example of FIG. 11. Here as before the reverse side of the H1 16 is illuminated with its conjugate reference beam, causing the red, green and blue H1 images to project on to the plane of the H2 recording material 30. Specifically the front surface of the H2 is positioned to be coincident/co-planar with the surface plane image (hence terminology). Then a second reference, the H2 reference is arranged to overlap with the red, green and blue images projected from the H1 to form a relief generating holographic interference pattern. As before (see the two plane scenario of FIG. 11) it should be noted that for this view of the H2 recording arrangement the red, green and blue images will appear to precisely overlap thus generating a complex holographic grating structure which is a superposition of respective red red, green and blue holographic grating structures needed to generate the desired achromat surface relief structure.

However, when we view the H2 recording arrangement along an axis transverse to the plane of dispersion, then we find the situation is a little more complicated in that the red and blue image elements do not naturally fully overlap or register with those image elements projected from the green slit, unless as described before, an appropriate registration off-set is applied to those 'non surface' image elements pertaining to the red and green slits.

For simplicity, we consider first the H1-H2 transfer geometry for the green slit formed in mask 32G as shown in FIG. 20*a*. Here we see because the green slit and projected are in line (i.e. the line bisecting the projected image elements and the green slit is ortho-normal/perpendicular to the plane of the H1) both the rear plane and the front plane image elements maintain their mutual registration with the surface plane element as arranged in the artwork mask assembly during the H1 recording.

However considering next FIG. 20*b* which the corresponding H1-H2 transfer geometry for the red slit formed in mask 32R we see that the projected rear plane image element '0' will record a red H2 image component which appear low (and out of register) with its surface plane counterpart '0' by an amount ΔR(rp), whilst the projected front plane element '5' will form a red H2 image element which appears high (and out of register) with its surface plane counterpart '0' by an amount ΔR(fp). Therefore, as described before, in order to record a red H2 image wherein the three planar image elements appear with the correct mutual register, it is necessary to apply a correction+ΔR(rp) to the rear plane artwork transmission mask and a correction−ΔR(fp) to the front plane artwork mask when preparing the three plane artwork assembly for recording into the previously generated red H1 slit.

Conversely, it follows from FIG. 20*c*, which shows the transfer geometry for the blue slit formed in mask 32B that it will be necessary in order to record a blue H2 image wherein the three planar image elements appear with the correct mutual register, to apply a correction−ΔR(rp) to the rear plane artwork transmission mask and a correction+ΔR(fp) to the front plane artwork mask when preparing the three plane artwork assembly for recording into the previously generated blue H1 slit.

An alternative approach to creating the achromat H1 (illustrated in FIG. 21), would be to record only a single H1 slit as per the geometry used to record the H1 slit (FIG. 8) but having the H1 recording slit directly facing the artwork mask assembly. Then to reconstruct this H1 slit to form an image on to the H2 recording material as described before. However, in this case the image projected from this slit is allowed to overlap first (exposure 1) with a first H2 reference beam which forms the appropriate angle ($\theta_R$) with the image or object beam such that it records a holographic interference pattern suitable for generating a 'red replaying' surface relief structure. Then the object image is allowed to overlap with a second H2 reference beam (exposure 2) which forms an angle of interference ($\theta_G$) with the object beam appropriate to generating a 'green replaying' surface relief structure. Finally the object image is allowed to overlap with a third H2 reference beam (exposure 3) which is this time forms an angle of interference ($\theta_B$) with the object beam needed to generate the 'blue replaying surface relief'.

The security devices of the current invention are suitable to be applied as labels to secure documents which will typically require the application of a heat or pressure sensitive adhesive to the outer surface of the device which will contact the secure document. In addition an optional protective coating/varnish could be applied to the exposed outer surface of the device. The function of the protective coating/varnish is to increase the durability of the device during transfer onto the security substrate and in circulation.

In the case of a transfer element, in either patch or strip form, rather than a label the security device is preferably prefabricated on a carrier substrate and transferred to the substrate in a subsequent working step. The security device can be applied to the document using an adhesive layer. The adhesive layer is applied either to the security device or the surface of the secure document to which the device is to be applied. After transfer the carrier strip can be removed leaving the security device as the exposed layer or alternatively the carrier layer can remain as part of the structure acting as an outer protective layer. A suitable method for transferring security devices based on cast cure devices comprising micro-optical structures is described in EP1897700.

The security device of the current invention can also be incorporated as a security strip or thread. Security threads are now present in many of the world's currencies as well as vouchers, passports, travellers' cheques and other documents. In many cases the thread is provided in a partially embedded or windowed fashion where the thread appears to weave in and out of the paper. One method for producing paper with so-called windowed threads can be found in EP0059056. EP0860298 and WO03095188 describe different approaches for the embedding of wider partially exposed threads into a paper substrate. Wide threads, typically with a width of 2-6 mm, are particularly useful as the additional exposed area allows for better use of optically variable devices such as the current invention.

The security device of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Additional optically variable materials can be included in the security device such as thin film interference elements, liquid crystal material and photonic crystal materials. Such materials may be in the form of filmic layers or as pigmented materials suitable for application by printing.

If the surface relief microstructure is provided with a metallised backing than demetallised indicia can be incorporated within a security device of the current invention.

One way to produce partially metallised/demetallised films in which no metal is present in controlled and clearly defined areas, is to selectively demetallise regions using a resist and etch technique such as is described in U.S. Pat. No. 4,652,015. Other techniques for achieving similar effects are for example aluminium can be vacuum deposited through a mask, or aluminium can be selectively removed from a composite strip of a plastic carrier and aluminium using an excimer laser. The metallic regions may be alternatively provided by printing a metal effect ink having a metallic appearance such as Metalstar® inks sold by Eckart.

The presence of a metallic layer can be used to conceal the presence of a machine readable dark magnetic layer. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

In a further example the security device of the current invention may be incorporated in a security document such that the device is incorporated in a transparent region of the document. The security document may have a substrate formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519, EP1398174 and WO03054297.

The invention claimed is:

1. A security device comprising a substrate carrying a surface relief optically variable effect generating structure formed by a super position of three diffractive image generating structures such that each of the three diffractive image generating structures fully overlap one another and the three diffractive image generating structures each respond to respectively different colour components or wavelength ranges of white light to generate together a first, substantially achromatic image or background pattern located in a plane spaced from a surface of the substrate.

2. A device according to claim 1, wherein the optically variable effect generating structure forms a second image in a plane of the substrate.

3. A device according to claim 2, wherein the second image is achromatic.

4. A device according to claim 2, wherein the second image is non-diffractive or non-holographic.

5. A device according to claim 1, wherein the first achromatic image defines a background image.

6. A device according to claim 1, wherein the first achromatic image is located in a plane appearing behind the surface of the substrate.

7. A device according to claim 1, wherein the first achromatic image appears in a plane in front of the surface of the substrate.

8. A device according to claim 1, wherein a spacing between a plane of the first achromatic image or background pattern and the plane of the substrate is such that, on tilting the device, the first achromatic image or background exhibits apparent movement relative to the substrate plane, a rate of movement being at least 6 mm per radian of tilt, and a product of the rate of movement and the included angle of the viewing zone defining a distance at least 18% of a dimension of the device in a direction of movement of the first achromatic image or pattern.

9. A device according to claim 1, further comprising a second achromatic image, the first and second achromatic images appearing in respective first and second planes in front of and behind the surface of the substrate respectively.

10. A device according to claim 9, wherein the spacing between the plane of the first achromatic image or background pattern and the plane of the second achromatic image is such that, on tilting the device, the first achromatic image or background exhibits apparent movement relative to the second achromatic image, the rate of movement being at least 6 mm per radian of tilt, and the product of the rate of movement and the included angle of the viewing zone defining a distance at least 18% of the dimension of the device in a direction of movement of the first achromatic image or pattern.

11. A device according to claim 1, wherein the achromatic images comprise symbols, graphical patterns, and alpha numeric characters.

12. An article carrying a security device, the security device comprising a substrate carrying a surface relief optically variable effect generating structure formed by a super position of three diffractive image generating structures such that each of the three diffractive image generating structures fully overlap one another and the three diffractive image generating structures each respond to respectively different colour components or wavelength ranges of white light to generate together a first, substantially achromatic image or background pattern located in a plane spaced from a surface of the substrate.

13. An article according to claim 12, wherein the article comprises paper or polymer.

14. An article according to claim 12, wherein the article comprises a banknote.

15. An article according to claim 12, wherein the article comprises one of a cheque, voucher, certificate of authenticity, stamp, brand protection article, or fiscal stamp.

16. A security thread, patch or strip incorporating a security device, the security device comprising a substrate carrying a surface relief optically variable effect generating structure formed by a super position of three diffractive image generating structures such that each of the three diffractive image generating structures fully overlap one another and the three diffractive image generating structures each respond to respectively different colour components or wavelength ranges of white light to generate together a first, substantially achromatic image or background pattern located in a plane spaced from a surface of the substrate.

17. A transferable label provided with a security device, the security device comprising a substrate carrying a surface relief optically variable effect generating structure formed by a super position of three diffractive image generating structures such that each of the three diffractive image generating structures fully overlap one another and the three diffractive image generating structures each respond to respectively different colour components or wavelength ranges of white light to generate together a first, substantially achromatic image or background pattern located in a plane spaced from a surface of the substrate.

* * * * *